United States Patent [19]
Ohnishi et al.

[11] Patent Number: 5,608,614
[45] Date of Patent: Mar. 4, 1997

[54] POWER CONVERTER

[75] Inventors: Masahito Ohnishi; Shozo Kataoka; Takashi Kanda; Takashi Yamasaki; Kazuo Yoshida, all of Kadoma, Japan

[73] Assignee: Matsushita Electric Works, Ltd., Osaka, Japan

[21] Appl. No.: 280,552

[22] Filed: Jul. 26, 1994

[30]    Foreign Application Priority Data

Jul. 27, 1993  [JP]  Japan ..................................... 185361

[51] Int. Cl.⁶ .................................................. H02M 3/18
[52] U.S. Cl. ............................. 363/60; 307/110; 323/293; 323/352
[58] Field of Search ................................ 363/59, 60, 61, 363/62; 323/293, 352; 307/110

[56]         References Cited

U.S. PATENT DOCUMENTS

| 4,017,785 | 4/1977 | Perper . |
| 4,398,120 | 8/1983 | Guillon ............... 307/110 X |
| 5,229,690 | 7/1993 | Ohnishi et al. . |
| 5,420,495 | 5/1995 | Hingorani ............ 323/352 X |
| 5,444,310 | 8/1995 | Kataoka et al. .......... 307/110 X |
| 5,444,610 | 8/1995 | Gandreau et al. .......... 323/293 X |

FOREIGN PATENT DOCUMENTS

WO9222954  12/1992  WIPO .

OTHER PUBLICATIONS

"Power Supply Designed For Power Factor Correction And Availability", IBM Technical Disclosure Bulletin, vol. 32, No. 9A, Feb. 1990, pp. 383–385.

*Primary Examiner*—Peter S. Wong
*Assistant Examiner*—Y. J. Han

[57]            ABSTRACT

A power converter has two switched capacitor circuits each including at least a plurality of sets of capacitors and switching elements, first of which circuits is provided for supplying a DC power to a load while second of which accumulates a power in a period receiving a higher input voltage, and the first switched capacitor circuit being made to receive, in a period receiving a lower input voltage, a power supplied from a DC power source and also the power supplied from the second switched capacitor circuit for supplying to the load the DC power of a constant voltage, in which an input current collectively taken up by the two switched capacitor circuits is made similar in the waveform to the input voltage to eliminate any harmonics distortion of the current drawn from the source, for attaining the supply of the DC power of the constant voltage to the load, whereby the power converter is rendered not to require any large inductor to be capable of being minimized in size and restraining any noise radiation from occurring.

14 Claims, 23 Drawing Sheets

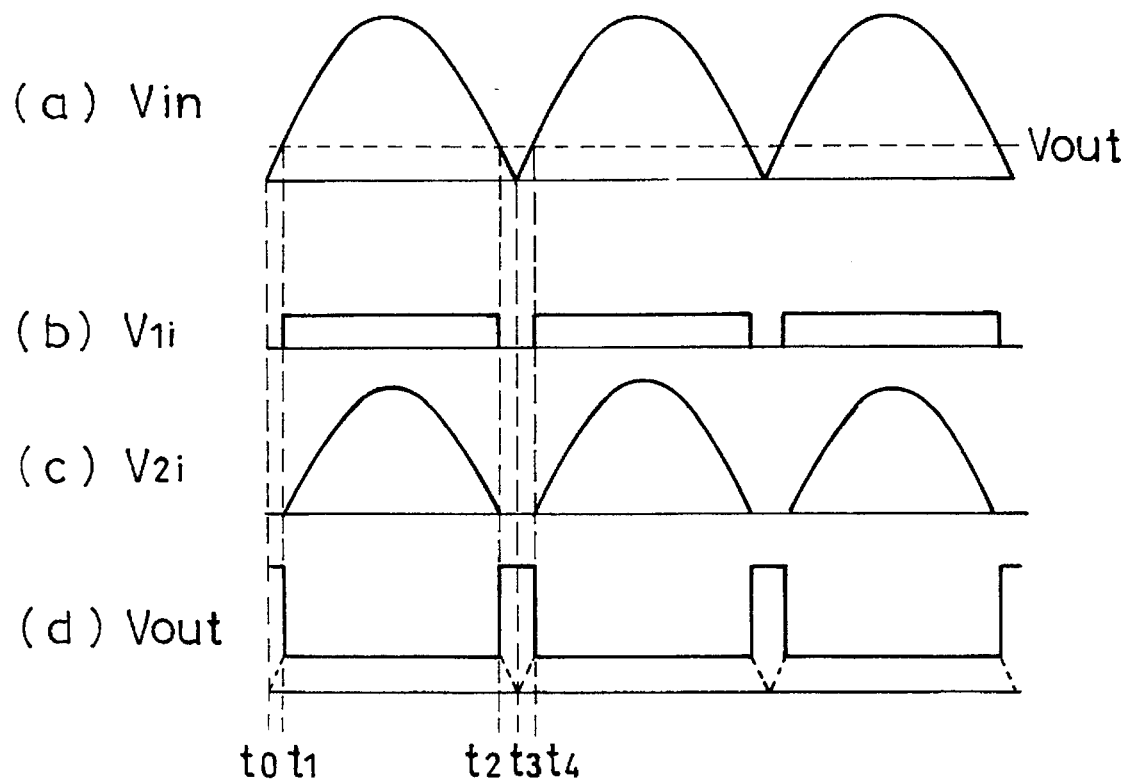

POWER CONVERTER

BACKGROUND OF THE INVENTION

The present invention relates to a power converter that converts an input voltage from a DC power source of a fluctuating voltage into a constant voltage for supplying a DC power to a load, that is, a power converter which enables a pulsating output of a diode bridge for rectifying an AC source power, for example, to be converted into a direct current of a constant voltage.

DESCRIPTION OF RELATED ART

Generally, for use as a power converter, there has been suggested arrangement for converting the pulsating output of a diode bridge circuit which rectifies the AC source power into the direct current with a boosting chopper circuit employed, in which event the boosting chopper circuit is constituted by connecting a series circuit of an inductor and a switching element to an output side of the diode bridge circuit, and a capacitor through a diode in parallel to the switching element, a both-end voltage of which capacitor is supplied to the load as a source power.

In this boosting chopper circuit, further, a magnetic energy is accumulated in the inductor in an ON period of the switching element, the capacitor is charged in an OFF period of the switching element with a sum of a voltage generated across the inductor by the magnetic energy and an output voltage of the diode bridge circuit, and a rectified output having a pulsation of the diode bridge circuit as a voltage across the capacitor is converted to be a substantial direct current.

In the foregoing boosting chopper circuit, the arrangement is so made that the magnetic energy accumulated in the inductor is caused to be varied by varying an ON-duty of the switching element in accordance with a variation in the output voltage of the diode bridge circuit, and a waveform of a current flowing through the inductor is made similar to a waveform of the output of the diode bridge circuit so as to have higher harmonics distortion of the input current eliminated for obtaining a constant output voltage.

With the foregoing power converter, however, there have been problems in that a large size inductor has been required from the viewpoint, in particular, of withstanding voltage, and that a noise is radiated by the magnetic energy of the inductor.

Another power converter has been suggested in U.S. Pat. No. 4,017,785, in which an inductor means is arranged for performing an energy feedback from a winding of an output transformer to a smoothing capacitor, so as to enable a power supply to an inverter circuit to be possible at a position adjacent to zero-cross point of input voltage while eliminating any higher harmonics distortion of the input current. However, this converter still involves such problems in that the transformer is required to be large in size, and that a noise is also radiated due to the magnetic energy of the transformer.

In U.S. Pat. No. 5,229,690, there is described another power converter in which a series circuit of a discharge lamp and a switching element is connected in parallel with a pulsating power source to which a rectified AC source power is given, the pulsating power source and discharge lamp are mutually connected in series when the switching element is ON to cause a current to directly flow through the lamp but, when the switching element is OFF, the current is employed to charge the smoothing capacitor while limiting the current, and any flicker of the discharge lamp is prevented from occurring while restraining any input higher harmonic by utilizing the charged energy when the input voltage is at points adjacent to the zero-cross. With this aspect of the inverter, however, no current is to be obtained from the input at the time when the input voltage is lower than the voltage of the smoothing capacitor, and there arises a problem that a complete effect of restraining the input higher harmonic cannot be obtained.

Still another power converter has been described in U.S. patent application Ser. No. 07/881,293, according to which an energy is provided to the discharge lamp by means of the charging and discharging operation of a capacitor having a very small capacitance, the discharge lamp is lighted without occurrence of flickering by means of a frequency of the charge and discharge set to be higher than a critical fusion frequency, while providing a current limiting effect of reducing the current to the discharge lamp due to the fact that the charge in the capacitor simultaneously disappears, and enabling the device size to be minimize. However, in the absence of means for accumulating the energy when the input voltage is adjacent to the zero-cross point and of means for eliminating the higher harmonics distortion of the input current, there remains a problem that the higher harmonics distortion of the input current cannot be eliminated.

SUMMARY OF THE INVENTION

A primary object of the present invention is, therefore, to provide a power converter which is capable of eliminating the foregoing problems, supplying to a load a DC power of constant voltage with any higher harmonics distortion of the input current eliminated, minimizing the entire device size, and sufficiently restraining any noise occurrence.

According to the present invention, the above object can be effectively realized by a power converter wherein a first power converting means including at least a plurality of capacitors and switching elements is connected to a power source having an instantaneous voltage which fluctuates, a load circuit is connected to output side of the first power converting means, a second power converting means connected to the first power converting means and the load circuit accumulates in an accumulating capacitor a power supplied in a period in which the source voltage is higher than a predetermined voltage, and the power accumulated in the accumulating capacitor is discharged to the load circuit in a period in which the source voltage is lower than the predetermined voltage, characterized in that a control means is provided for causing a predetermined output voltage from each of the first and second power converting means to said load circuit, and for rendering a composite current waveform of respective first and second input currents to be substantially similar to the source voltage waveform.

Other objects and advantages of the present invention should become clear as the following description of the present invention advances as detailed with reference to respective preferred embodiments shown in the accompanying drawings.

BRIEF DESCRIPTION OF THE DRAWINGS

FIG. 32 is a waveform diagram illustrating the operation of the embodiment shown in FIG. 31.

Figure 1:
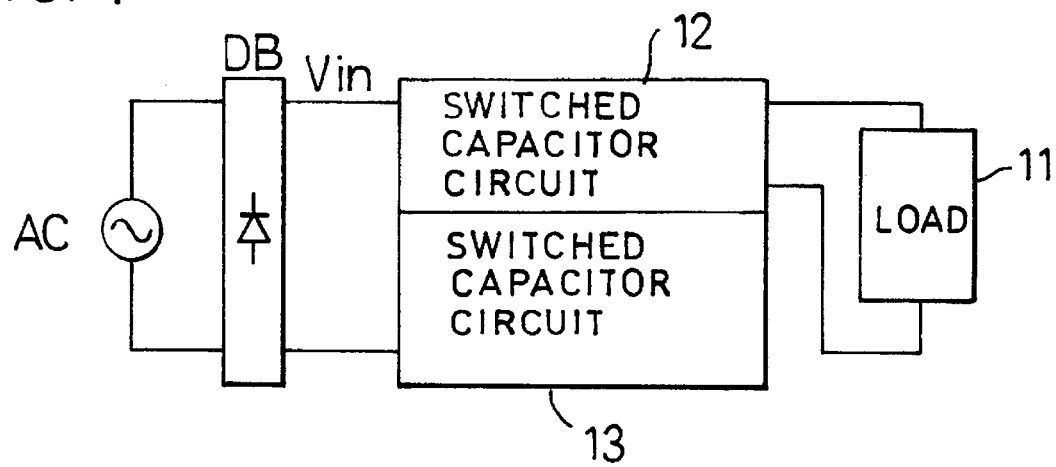
FIG. 1 illustrates a block circuit diagram of a first exemplary embodiment of the power converter according to the present invention.

While the present invention shall now be described with reference to the respective embodiments shown in the drawings, it should be appreciated that the intention is not to limit the present invention only to the embodiments shown but rather to include all alterations, modifications and equivalent arrangements possible within the scope of appended claims.

DETAILED DESCRIPTION OF THE PREFERRED EMBODIMENTS

Figure 2:
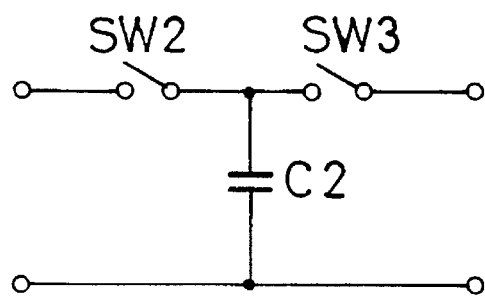
FIGS. 2 and 3 are fragmentary circuit diagrams showing constituent elements of switched capacitor circuits employed in the converter of FIG. 1.
Figure 3:
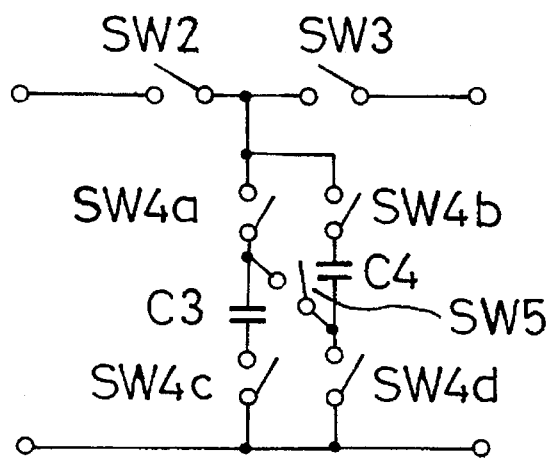

In FIGS. 1 to 3, there is shown an embodiment of the power converter according to the present invention, in which two switched capacitor circuits 12 and 13 respectively comprising at least a capacitor and a plurality of switching elements are connected between a diode bridge circuit DB and a load 11. One switched capacitor circuit 12 is provided for supplying power to the load 11, and the other switched capacitor circuit 13 is so provided that, when an input voltage $V_{in}$ from the diode bridge circuit DB to the circuit 13 is high, the circuit DB accumulates power, that is, energy supplied from the diode bridge DB but, when the input voltage $V_{in}$ is low, that is, in a period in which a supplied AC voltage from an AC power source AC to the diode bridge DB is adjacent to zero-cross point, the circuit 13 supplies the accumulated power to the one switched capacitor circuit 12. In other words, the switched capacitor circuit 12 is to supply power of constant voltage to load 11 by means of the power supplied from the diode bridge DB in the period when the input voltage $V_{in}$ is high and by means of power supplied from the other switched capacitor circuit 13 in addition to the power supplied from the diode bridge circuit DB in the period when the input voltage $V_{in}$ is low. At this time, a total waveform of a current taken up by the two switched capacitor circuits 12 and 13 is made similar to a waveform of the input voltage $V_{in}$, so as to eliminate any higher harmonics distortion of the input current. Further, as will be appreciated, the switched capacitor circuit 12 also performs a function of composing the voltage as well as a voltage conversion function, while the other switched capacitor circuit 13 is also arranged for performing the voltage conversion of the power supplied from the diode bridge DB so as to be supplied to the switched capacitor circuit 12.

In FIGS. 2 and 3, there are shown practical working aspects of the respective switched capacitor circuits 12 and 13, in which FIG. 2 is an example of employing a single capacitor and FIG. 3 is another example employing two capacitors. In the aspect of FIG. 2, two switching elements $SW_2$ and $SW_3$ are connected in series to a positive pole side output line of the diode bridge DB (which shall be referred to hereinafter as "positive pole line") while the capacitor $C_2$ is connected between a junction point of both switching elements $SW_2$ and $SW_3$ and a negative pole side output line of the diode bridge. DB (which shall be referred to hereinafter as "negative pole line"). The switching elements $SW_2$ and $SW_3$ are alternately turned ON and OFF so that, when the element $SW_2$ is ON, the capacitor $C_2$ will be charged by an output voltage applied from the side of the diode bridge DB to have the energy supplied from the diode bridge DB accumulated in the capacitor $C_2$ and, when the other switching element $SW_3$ is ON, the power will be supplied to the load 11 with the accumulated energy in the capacitor $C_2$ made to be the charged source power.

In the aspect of FIG. 3, the switching elements $SW_2$ and $SW_3$ are also connected in series to the positive pole line, a series circuit of switching element $SW_{4a}$, capacitor $C_3$ and switching element $SW_{4c}$ as well as a series circuit of switching element $SW_{4b}$, capacitor $C_4$ and switching element $SW_{4d}$ are connected in parallel between the junction point of both switching elements $SW_2$ and $SW_3$ and the negative pole line, and a further switching element $SW_5$ is connected between a junction point of the switching element $SW_{4a}$ to the capacitor $C_3$ and a junction point of the capacitor $C_4$ to the switching element $SW_{4d}$.

The switching elements $SW_2$ and $SW_3$ in the aspect of FIG. 3 are also alternately turned ON and OFF so that, when the switching element $SW_2$ is switched ON, the switched capacitor circuit receives the power from the side of the diode bridge circuit DB, the capacitor $C_3$ and $C_4$ are made to be in a mutually series connected or parallel connected state in accordance with an ON operation of other switching elements $SW_{4a}$–$SW_{4d}$ and $SW_5$, and the power supplied from the diode bridge circuit DB is accumulated in the capacitors $C_3$ and $C_4$. At this time, the capacitors $C_3$ and $C_4$ are connected in parallel when the switching elements $SW_{4a}$–$SW_{4d}$ are ON and the switching element $SW_5$ is OFF, but are connected in series when the switching elements $SW_{4b}$, $SW_{4c}$ and $SW_5$ are ON and the switching elements $SW_{4a}$ and $SW_{4d}$ are OFF. In an event when the switching element $SW_3$ is turned ON, the power is supplied to the side of the load 11 with the accumulated charge in the capacitor $C_3$ and $C_4$ as the power source. In this event, too, the voltage conversion of the input voltage $V_{in}$ can be carried out by changing over the connection of the capacitors $C_3$ and $C_4$ to be in series and parallel.

The switched capacitor circuits 12 and 13 may be constituted by properly modifying the number of the capacitors or combinations of a plurality of circuits based on the above described arrangements. That is, the switched capacitor circuits 12 and 13 may be so constituted that a desired energy is stored in the capacitors by controlling the charged energy in the plurality of capacitors. A larger composite capacitance of the plurality of capacitors in the switched capacitor circuits 12 and 13 allows the energy stored to be made larger, and a smaller composite capacitance renders the storable energy to likewise be reduced. Thus, it is enabled to store a desired amount of energy in the capacitor as occasion demands. Accordingly, in the present embodiment, the power supply to the load 11 can be realized by changing over the connecting state of the capacitors that the energy accumulated in the capacitors upon supplying the power to the load 11 will reach the desired value, and a constant power can be supplied to the load 11.

In the above arrangement, the variation in the composite capacitance causes an integration value of the current flowing through the circuit comprising a plurality of capacitors also to be varied. That is, when the composite capacitance is increased, the integration value of the flowing current is also increased, but the composite capacitance reduced renders the integration value of the flowing current to also be decreased. Further, the switched capacitor circuits 12 and 13 of the present embodiment are so constituted that, in taking up the input current from the diode bridge circuit DB, the total current, that is, the input current will have a waveform similar to that of the input voltage $V_{in}$, and a smooth control of the input higher harmonics can be realized thereby.

Figure 4:
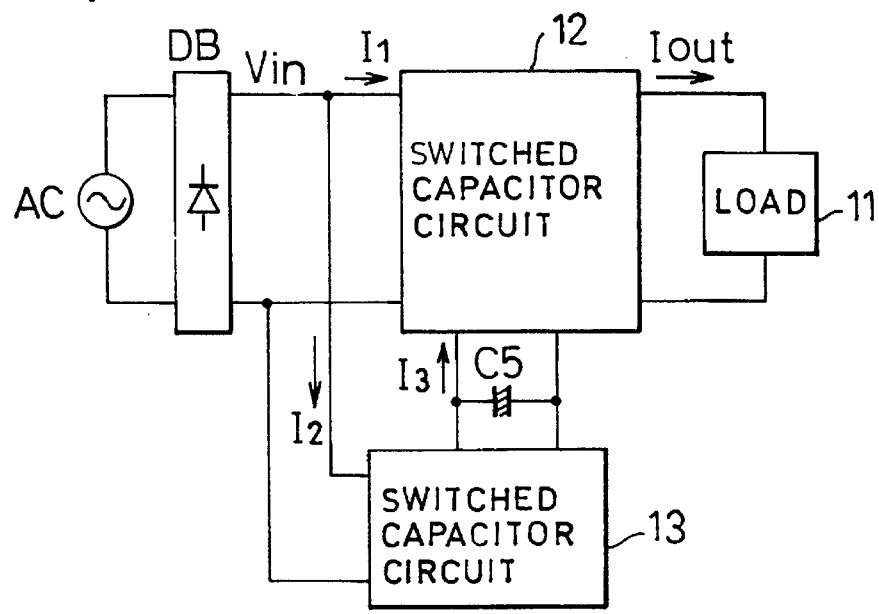
FIG. 4 is a block circuit diagram showing another exemplary embodiment of the present invention.

In FIG. 4, there is shown another embodiment according to the present invention, in which the switched capacitor circuits 12 and 13 are connected in parallel to the output side of the diode bridge circuit DB, and a storage capacitor $C_5$ is provided on the output side of the switched capacitor circuit 13 so that the charge accumulated in this switched capacitor circuit 13 is once shifted to the storage capacitor $C_5$ and the power to the switched capacitor circuit 12 is supplied with the charge thus shifted into this storage capacitor $C_5$ made as the power source.

Figure 5:
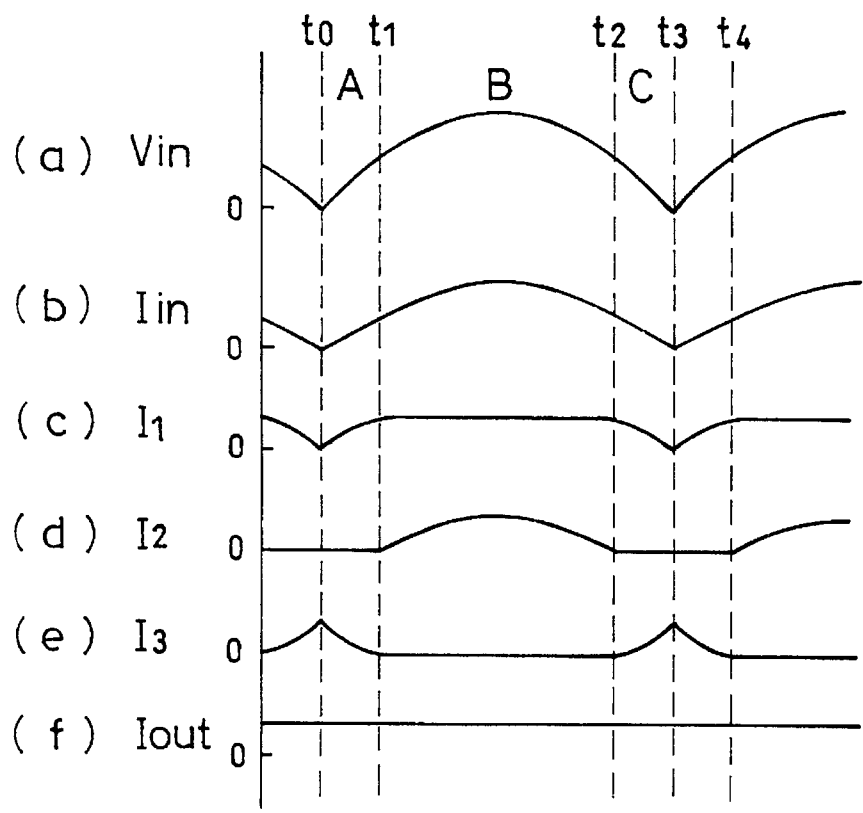
FIG. 5 is a waveform diagram illustrating the operation of the embodiment shown in FIG. 4.
Figure 6:
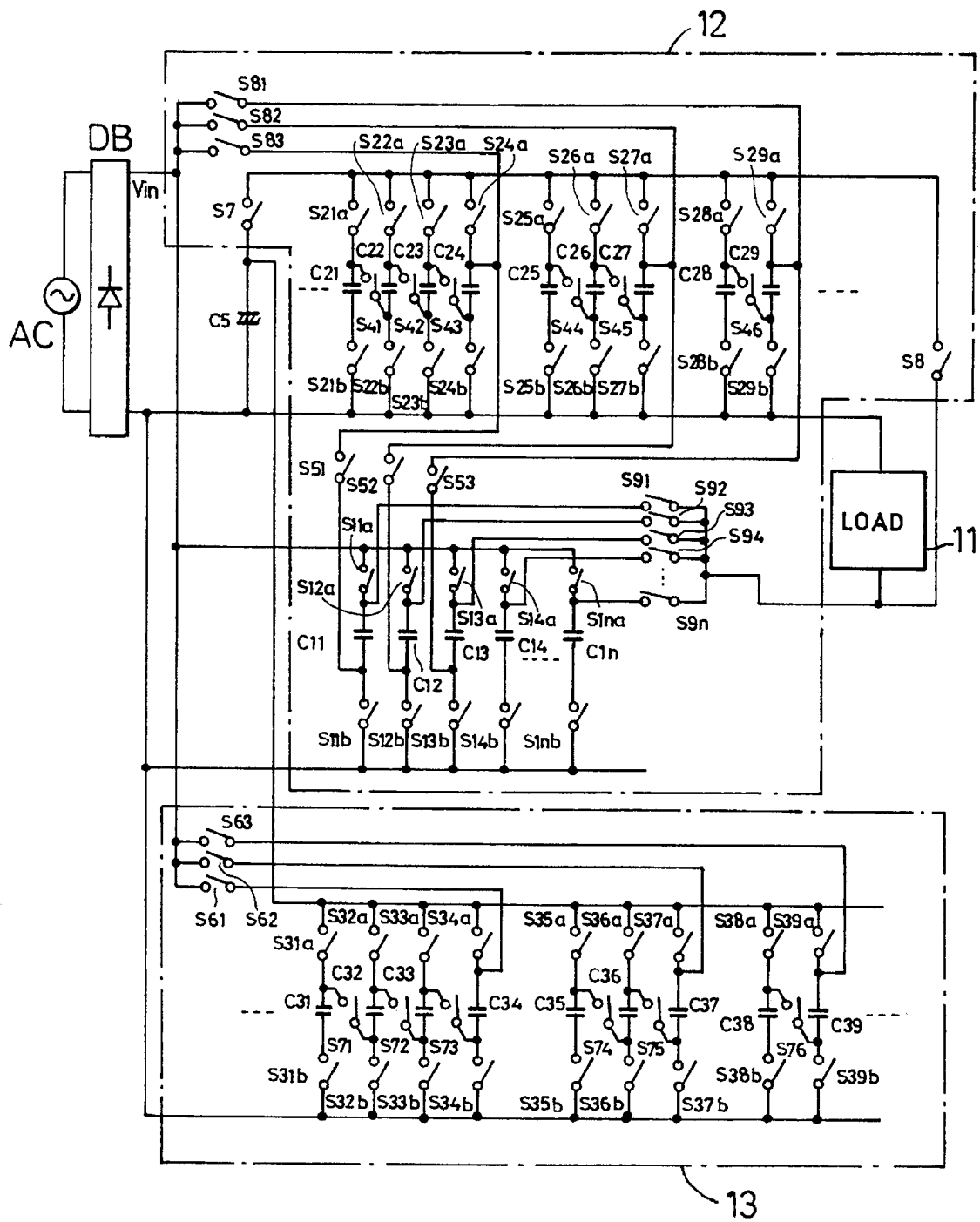
FIG. 6 is a detailed circuit diagram employable in the embodiments shown in FIGS. I to 4.
Figure 7:
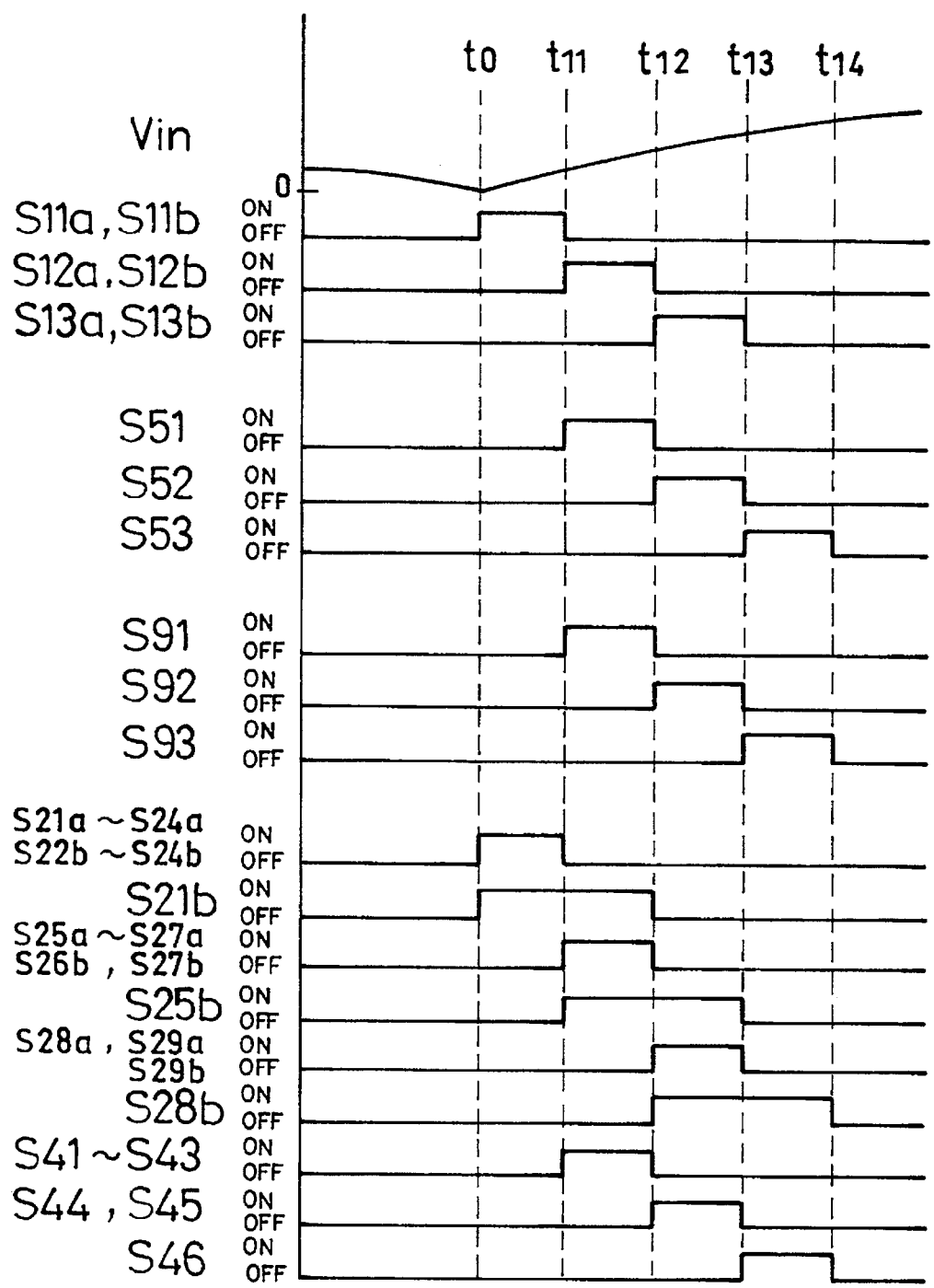
FIGS. 7 to 10 are waveform diagrams illustrating the operation of the circuit of FIG. 6.
Figure 8:
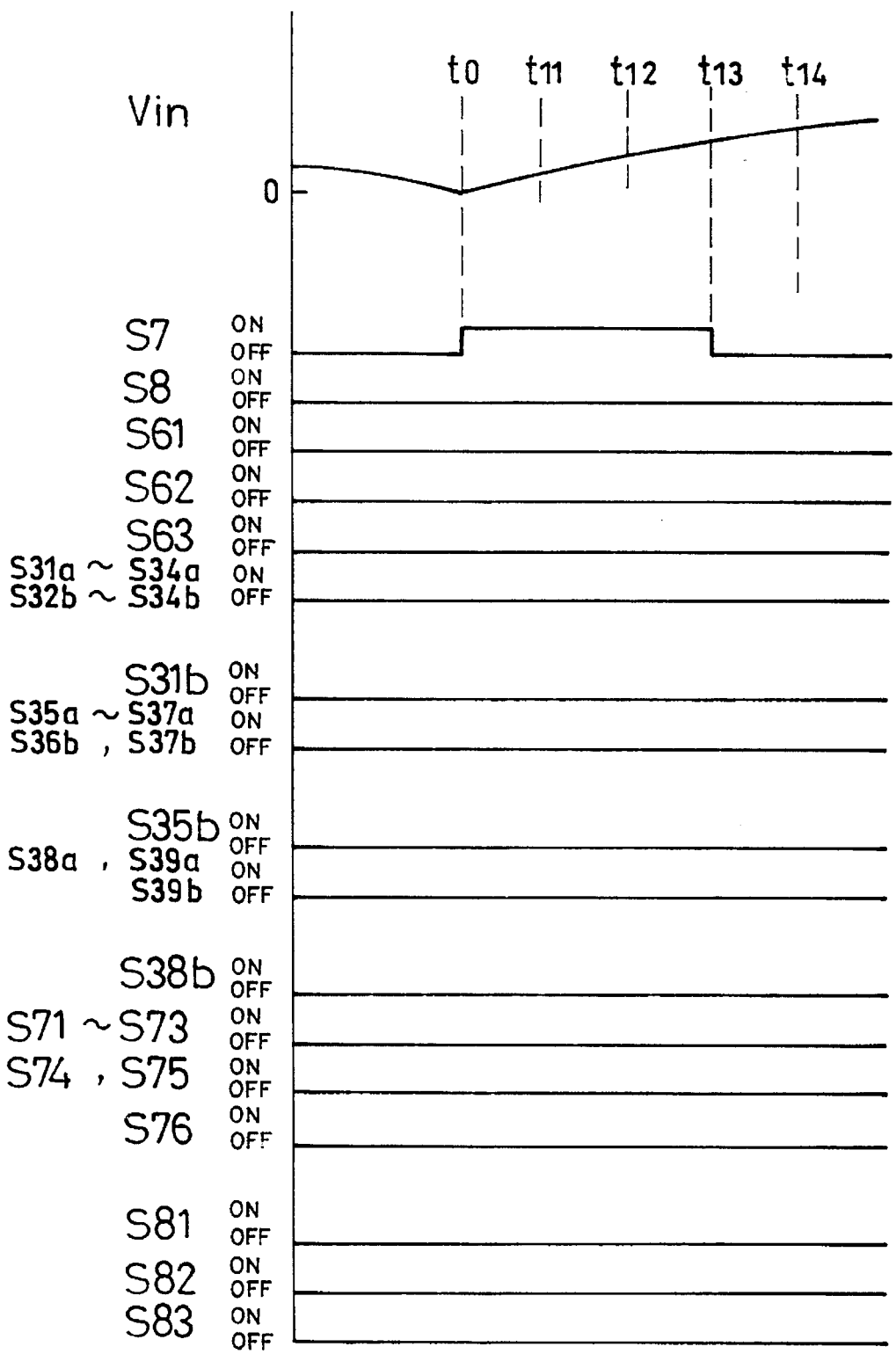
Figure 9:
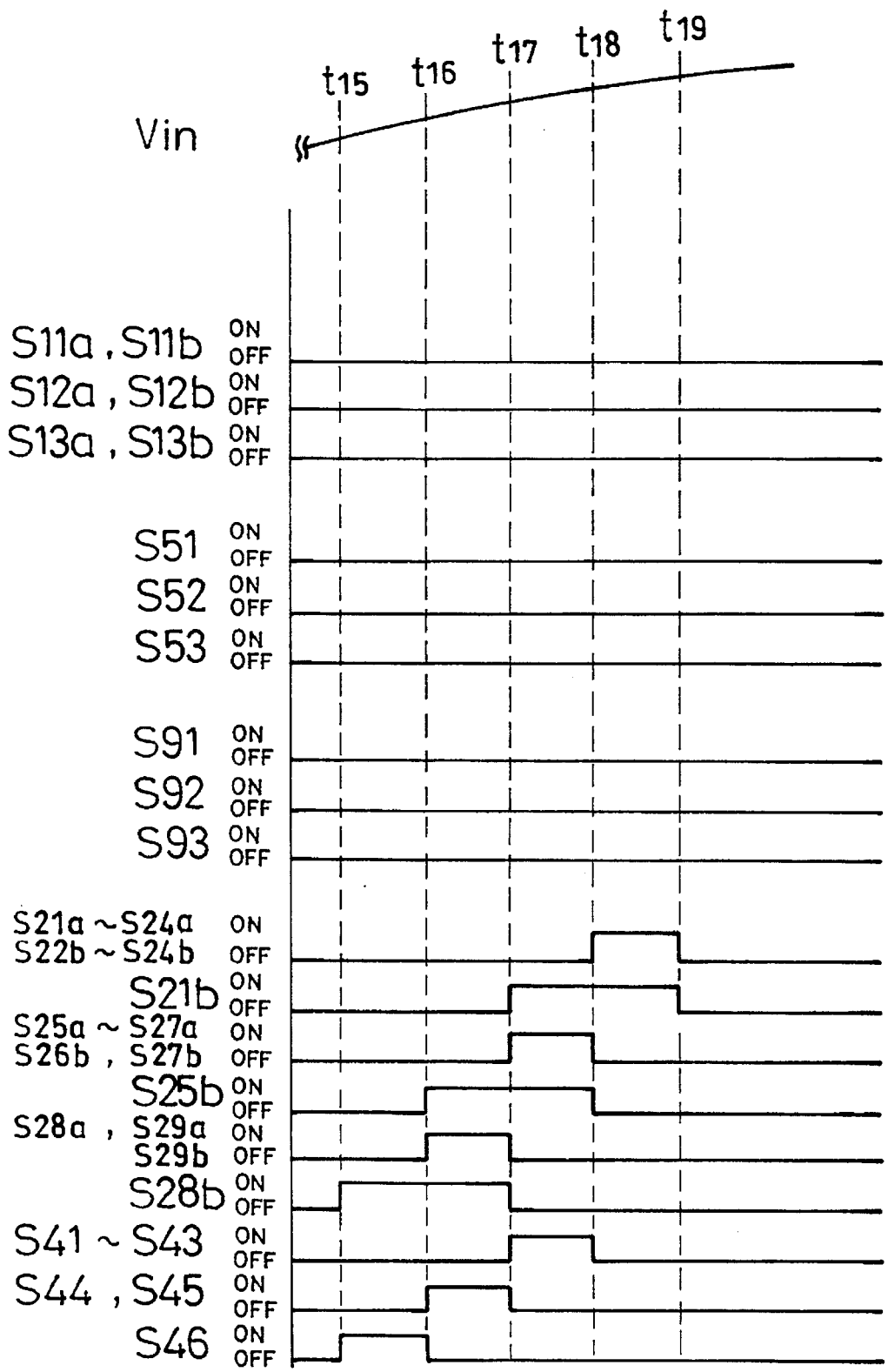
Figure 10:
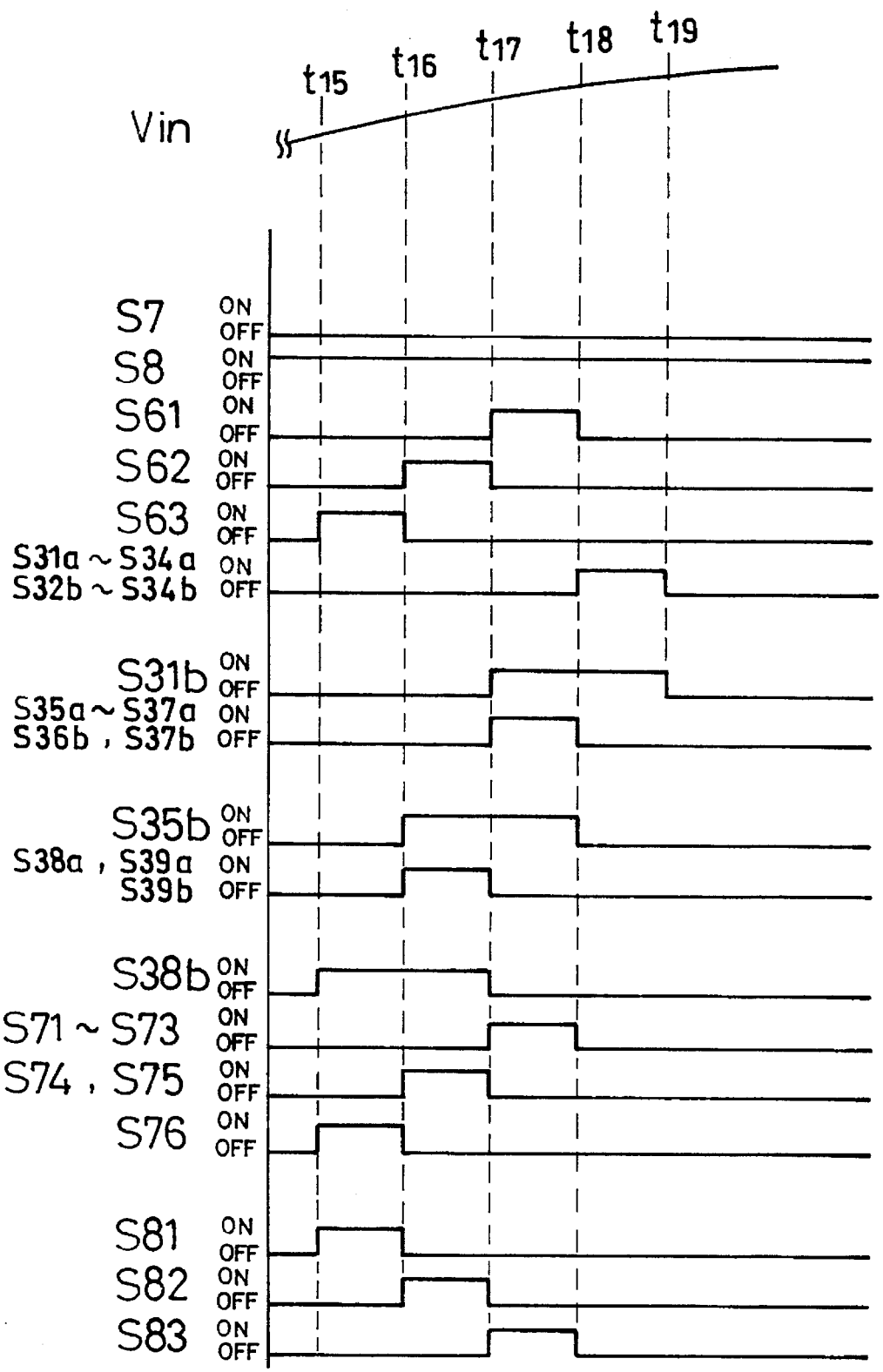

Referring to the operation of the embodiment of FIG. 4 with reference to FIG. 5, such constant current as shown by a waveform of FIG. 5(c) is taken up by the switched capacitor circuit 12 in a period B from time $t_1$ to time $t_2$, and the power supplied from the diode bridge circuit DB is supplied to the load 11 as converted into the constant DC power. In the switched capacitor circuit 13, on the other hand, such current as shown in FIG. 5(d) of a waveform similar to that of such input voltage $V_{in}$ as shown in FIG. 5(a) is taken up, and the energy is thereby made to be accumulated in the circuit 13 during the period B of $t_1$ to $t_2$. Here, the energy accumulated is shifted to the storage capacitor $C_5$ in the period B of $t_1$ to $t_2$. In a period A of $t_0$ to $t_1$ or in a period C of $t_2$ to $t_3$, the switched capacitor circuit 12 takes up a current of such waveform similar to the input voltage $V_{in}$ as shown in FIG. 5(c), upon which the switched capacitor circuit 12 adds the power supplied from the storage capacitor $C_5$ to the power supplied from the diode bridge circuit DB, and supplies the sum power to the load 11 through the conversion into the DC power of a constant voltage. The current made to flow at this time by the charge in the storage capacitor $C_5$ made as the power source is shown as denoted by $I_3$ in FIG. 5(e). Here, the arrangement is so made that a composite current of the currents $I_1$ and $I_2$ taken up by the switched capacitor circuits 12 and 13, that is, the input current $I_{in}$ will have such waveform as shown in FIG. 5(b) which is similar to the waveform of the input voltage $V_{in}$, and any input higher harmonics can be restrained thereby. In FIG. 6, there is shown a more concrete working aspect of the switched capacitor circuits 12 and 13 in the embodiment of FIG. 6, in which the switched capacitor circuit 12 comprises capacitors $C_{11}$–$C_{1n}$ and $C_{21}$–$C_{29}$, and switching elements $S_{11a}$–$S_{1na}$, $S_{11b}$–$S_{1nb}$, $S_{21a}$–$S_{29a}$, $S_{21b}$–$S_{29b}$, $S_{41}$–$S_{46}$, $S_{51}$–$S_{53}$, $S_7$, $S_8$, $S_{81}$–$S_{83}$ and $S_{91}$–$S_{9n}$, while the other switched capacitor circuit 13 comprises capacitors $C_{31}$–$C_{39}$ and switching elements $S_{31a}$–$S_{39a}$, $S_{31b}$–$S_{39b}$, $S_{61}$–$S_{63}$ and $S_{71}$–$S_{76}$.

Referring here to the operation of this working aspect of FIG. 6 also by reference to FIGS. 7 to 10, the operation in the period A in which the input voltage $V_{in}$ is low shall be referred to first. At time $t_0$ corresponding to zero-cross point of the AC power source AC, the switching elements $S_{11a}$ and $S_{11b}$ are turned ON so that the capacitor $C_{11}$ will be connected to the output side of the diode bridge circuit DB. At the same time, the switching elements $S_7$, $S_{21a}$–$S_{24a}$ and $S_{21b}$–$S_{24b}$ are switched ON so that the capacitors $C_{21}$–$C_{24}$ will be connected in parallel with the storage capacitor $C_5$ to be charged. At time $t_{11}$, the switching elements $S_{11a}$, $S_{11b}$, $S_{21a}$–$S_{24a}$ and $S_{22b}$–$S_{24b}$ are turned OFF, and the switching elements $S_{41}$–$S_{43}$, $S_{51}$ and $S_{91}$ are switched ON. At this time, the switching element $S_{21b}$ is still in an ON state. Consequently, the capacitors $C_{11}$ and $C_{21}$–$C_{24}$ are connected in series, and the sum voltage of respective both-end voltages of these capacitors $C_{11}$ and $C_{21}$–$C_{24}$ is applied to the load 11. Also at this time $t_{11}$, simultaneously, the switching elements $S_{12a}$ and $S_{12b}$ are switched ON so that the capacitor $C_{12}$ is connected to the output side of the diode bridge DB and is thereby charged. Further, by switching the switching elements $S_{25a}$–$S_{27a}$ and $S_{25b}$–$S_{27b}$ ON, the capacitors $C_{25}$–$C_{27}$ are connected in parallel with the storage capacitor $C_5$ to be charged. At time $t_{12}$, the switching elements $S_{12a}$, $S_{12b}$, $S_{25a}$–$S_{27a}$, $S_{26b}$, $S_{27b}$, $S_{41}$–$S_{43}$, $S_{51}$, $S_{91}$ and $S_{21b}$ are switched OFF while the switching elements $S_{44}$, $S_{45}$, $S_{52}$ and $S_{92}$ are switched ON, with the switching element $S_{25b}$ maintained in the ON state, so that the capacitors $C_{12}$ and $C_{25}$–$C_{27}$ are made in the series connection, and the sum voltage of respective both-end voltages of these capacitors $C_{12}$ and $C_{25}$–$C_{27}$ is applied to the load 11. At this time $t_{12}$, the switching elements $S_{13a}$ and $S_{13b}$ are simultaneously switched ON, to have the capacitor $C_{13}$ connected to the output side of the diode bridge circuit DB for charging this capacitor $C_{13}$. Further, by turning the switching elements $S_{28a}$, $S_{29a}$, $S_{28b}$ and $S_{29b}$ ON, the capacitors $C_{28}$ and $C_{29}$ are connected in parallel to the storage capacitor $C_5$ for charging. At time $t_{13}$, the switching elements $S_{13a}$, $S_{13b}$, $S_{28a}$, $S_{29a}$, $S_{29b}$, $S_{44}$, $S_{45}$, $S_{52}$, $S_{92}$, $S_{25b}$ and $S_7$ are switched OFF to have the switching elements $S_{46}$, $S_{53}$ and $S_{93}$ switched ON. At this time, the switching element $S_{28b}$ is maintained in the ON state. The capacitors $C_{13}$, $C_{28}$ and $C_{29}$ are thereby placed in the series connection, and the sum voltage of the respective both-end voltages is applied to the load 11.

In the above, the capacitors $C_{11}$–$C_{1n}$ are made to the same capacitance, and the capacitors $C_{21}$–$C_{29}$ are also set to have the same capacitance. The voltage of the capacitors $C_{11}$–$C_{13}$ increases at a rate substantially similar to the input voltage $V_{in}$ (i.e., the input current $I_{in}$ substantially similar to the input voltage $V_{in}$ flows), so that the higher harmonics distortion of the input current can be eliminated. An output voltage $V_{out}$ of the switched capacitor circuit 12 is made substantially constant in such manner that, for the period in which the input voltage $V_{in}$ is low, both-end voltages of the capacitors $C_{21}$–$C_{24}$ and the both-end voltage of the capacitor $C_{11}$ are added, and the number of the capacitors connected in series is decreased to be such as the capacitors $C_{25}$–$C_{27}$ and $C_{12}$ and the capacitors $C_{28}$, $C_{29}$ and $C_{13}$, as the input voltage $V_{in}$ rises.

Referring next to the period B in which the input voltage $V_{in}$ is high the switching elements $S_{28b}$, $S_{46}$ and $S_{81}$ are switched ON at time $t_{15}$, so that the capacitors $C_{28}$ and $C_{29}$ are connected in series to the output side of the diode bridge DB to be charged thereby. At this time, the switching elements $S_{63}$, $S_{76}$ and $S_{38b}$ are switched ON, so that the capacitors $C_{38}$ and $C_{39}$ are connected in series to the output side of the diode bridge DB to be charged thereby. At time $t_{16}$, the switching elements $S_{46}$, $S_{63}$, $S_{76}$ and $S_{81}$ are switched OFF while the switching elements $S_{28a}$, $S_{29a}$, $S_{28b}$, $S_{29b}$ and $S_8$ are switched ON to have the capacitors $C_{28}$ and $C_{29}$ connected in parallel, and the source power is supplied to the load 11. At the same time, the switching elements $S_{38a}$, $S_{39a}$, $S_{38b}$ and $S_{39b}$ are switched ON, the capacitors $C_{38}$ and $C_{39}$ are connected in parallel, and the storage capacitor $C_5$ is charged. Further, the switching elements $S_{25b}$, $S_{44}$, $S_{45}$ and $S_{82}$ are turned ON, the capacitors $C_{25}$–$C_{27}$ are connected in series to the output side of the diode bridge DB to be charged, the switching elements $S_{62}$, $S_{74}$, $S_{75}$ and $S_{35b}$ are switched ON, and the capacitors $C_{35}$–$C_{37}$ are connected in series to the output side of the diode bridge circuit DB to be charged thereby.

In the same manner hereinafter, the capacitors $C_{25}$–$C_{27}$ are connected in parallel at time $t_{17}$ for supplying power to the load 11, the capacitors $C_{35}$–$C_{37}$ are connected in parallel for charging the storage capacitor $C_5$, the capacitors $C_{21}$–$C_{24}$ are connected in series to the output side of the diode bridge circuit DB to be charged, and the capacitors $C_{31}$–$C_{34}$ are connected in series to the output side of the diode bridge circuit DB to be charged. At time $t_{18}$, the capacitors $C_{21}$–$C_{24}$ are connected in parallel for the power supply to the load 11, and the capacitors $C_{31}$–$C_{34}$ are also connected in parallel for charging the storage capacitor $C_5$. That is, the switched capacitor circuit 12 is so arranged that, in the period B when the input voltage $V_{in}$ is high, the capacitors' capacitance is decreased by varying the number of series connected capacitors of the same capacity in the capacitors $C_{21}$–$C_{29}$ in accordance with the increment in the input voltage $V_{in}$, and the current flowing to the switched capacitor circuit 12 is made constant. Here, the capacitors $C_{31}$–$C_{39}$ in the switched capacitor circuit 13 are so set that the capacitance upon the series connection will be the same, by providing, for example, the capacitors $C_{31}$–$C_{34}$ to be 4Cx, the capacitors $C_{35}$–$C_{37}$ to be 3Cx and the capacitors $C_{38}$ and $C_{39}$ to be 2Cx, and the current flowing to the switched capacitor circuit 13 will be of a similar waveform to that of the input voltage $V_{in}$. Consequently, the input current $I_{in}$ as the total current of the switched capacitor circuits 12 and 13 is made to be substantially similar to the input voltage $V_{in}$ and the higher harmonics distortion of the input current can be eliminated.

Further, by discharging the series-charged capacitors $C_{21}$–$C_{29}$ in parallel (or in a combination of series and parallel portions, instead of full parallel relationship), a combined both-end voltage of the respective capacitors $C_{21}$–$C_{29}$ is made substantially constant irrespective of the variation in the input voltage $V_{in}$, and the power of the constant voltage can be supplied to the load 11. Similarly, by the shift of the charges accumulated in the capacitors $C_{31}$–$C_{39}$ into the storage capacitor $C_5$, the power supply at every time of $t_0$–$t_{14}$ can be realized in a smooth manner. In this case, the switched capacitor circuit 13 and storage capacitor $C_5$ are to perform a function of accumulating any excessive energy in the period when the input voltage $V_{in}$ is high and discharging the accumulated energy to the load 11 when the input voltage $V_{in}$ is low.

While in the above the description has been made with reference to the case where the input voltage $V_{in}$ increases, as an example, it should be appreciated that, in the event where the input voltage $V_{in}$ decreases, the circuits may only be operated to carry out the foregoing operation inversely in time.

Figure 11:
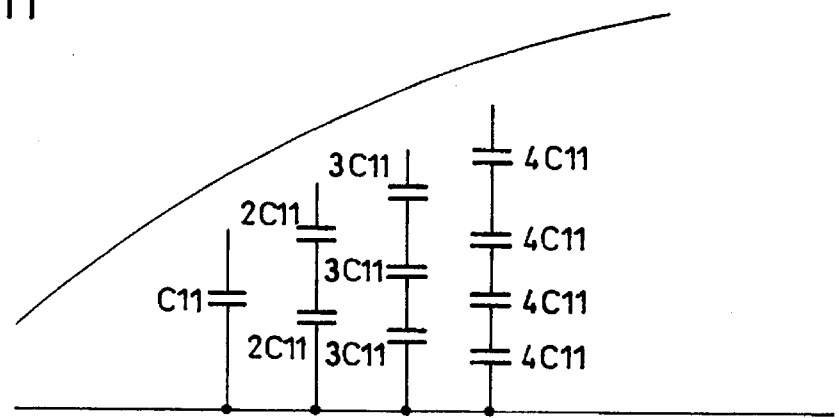
FIG. 11 is an explanatory view for another embodiment of the present invention.
Figure 12:
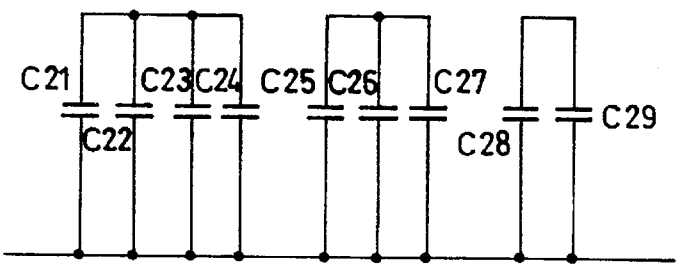
FIGS. 12 and 13 are explanatory views for working aspects employable in the embodiment of FIG. 11.
Figure 13:
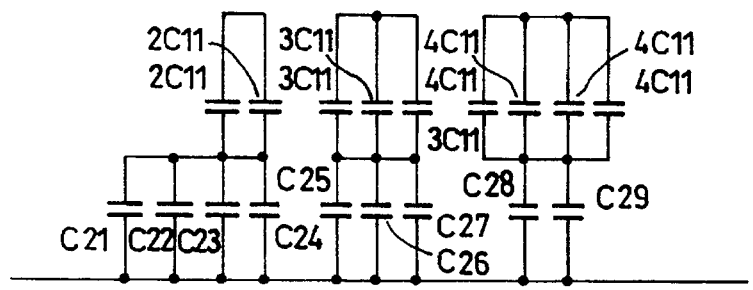

In other embodiments according to the present invention as shown in FIGS. 11 to 13, the capacitance of the respective capacitors corresponding to the capacitors $C_{11}$–$C_{1n}$ is made constant in the periods A and C when the input voltage $V_{in}$ is low similarly to the foregoing embodiment of FIG. 6. While the circuit arrangement of the switched capacitor circuit 12 may be different from that of FIG. 6, the description shall be made here with respect to the operation according to the connecting state of the capacitors.

In the embodiment of FIG. 11, in place of the capacitors $C_{11}$–$C_{1n}$ in the foregoing embodiment, one capacitor of a capacitance $C_{11}$, two capacitors of a capacitance $2C_{11}$, three capacitors of a capacitance $3C_{11}$ and four capacitors of a capacitance $4C_{11}$ are provided. In the period of the low input voltage $V_{in}$, the number of the series connected capacitors is sequentially increased in accordance with the increase in the input voltage $V_{in}$ such that, with respect to the output side of the diode bridge circuit DB, the capacitor of the capacitance $C_{11}$ is connected, two of the capacitors of the capacitance $2C_{11}$ are connected in series, three of the capacitors of the capacitance $3C_{11}$ are connected in series, and four of the capacitors of the capacitance $4C_{11}$ are connected in series. In this event, the increase in the number of the capacitors connected in series does not cause the composite capacitance of these capacitors to be varied but kept to be $C_{11}$, whereas the input current $I_{in}$ is caused to be varied accompanying the increase in the input voltage $V_{in}$, that is, the waveform of the input current $I_{in}$ is made to be similar to that of the input voltage $V_{in}$, and any higher harmonics distortion of the input current can be eliminated thereby.

Further, by varying the number of the capacitors to be connected in series in response to the input voltage, it is possible to render the both-end voltage of the respective capacitors to be at a constant voltage irrespective of the increase in the input voltage $V_{in}$. Further, the capacitors $C_{21}$–$C_{29}$ are to be charged by connecting them in parallel with the storage capacitor $C_5$ in the same manner as in the embodiment of FIG. 6. In this event, the both-end voltage of the capacitors $C_{21}$–$C_{29}$ connected in parallel is made constant. Now, as shown in FIG. 13, the arrangement may be so made that the capacitors to be charged in such series connection as in FIG. 11 are changed in their connecting state over to the parallel connection or, instead of the full parallel connection, to a combination of the series and parallel connections, the constant voltage of these capacitors is added to the both-end voltage of the foregoing capacitors $C_{21}$–$C_{29}$, and the power of constant voltage is to be supplied to the load 11. In this event, the operation in the period B of the high input voltage $V_{in}$ may be the same as in the embodiment of FIG. 6.

Figure 14:
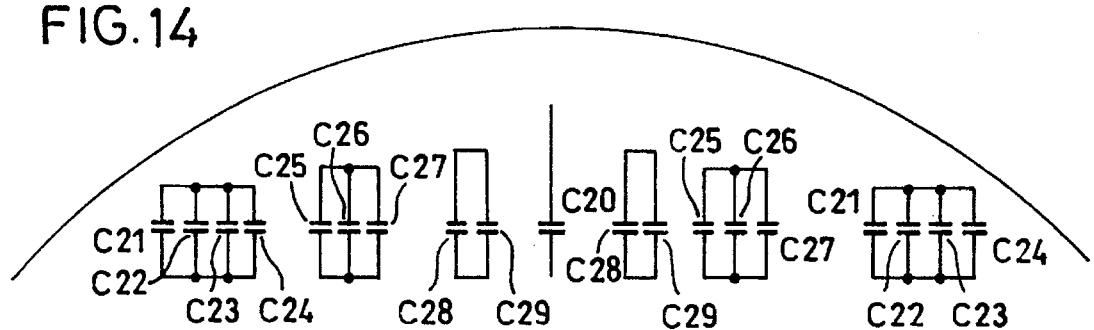
FIG. 14 is an explanatory view for another embodiment of the present invention.
Figure 15:
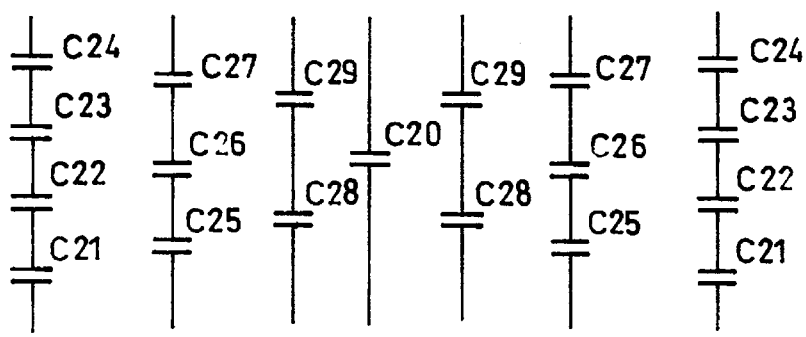
FIG. 15 is a circuit diagram showing a working aspect employable in the embodiment of FIG. 14.

In another embodiment shown in FIGS. 14 and 15, in contrast to the embodiment of FIG. 6 in which the number of the series connected capacitors $C_{21}$–$C_{29}$ of the same capacitance is increased to reduce the composite capacitance in response to the rise in the input voltage $V_{in}$ in the period B of the high input voltage $V_{in}$ for rendering the current $I_1$ taken up by the switched capacitor circuit 12 to be constant, the number of the parallel connected capacitors $C_{20}$–$C_{29}$ of the same capacitance is decreased to reduce the composite capacitance in response to the rise in the input voltage $V_{in}$ for rendering the current $I_1$ taken up by the switched capacitor circuit 12 to be constant. In carrying out the above operation, the circuit of FIG. 6 may be provided with a capacitor $C_{20}$ and a switch element for controlling its connection. At this time, the both-end voltage of the capacitors $C_{20}$–$C_{29}$ connected in parallel will be a voltage in accordance with the input voltage $V_{in}$, and the arrangement will be so made that the capacitors $C_{20}$–$C_{29}$ are connected in series and their both-end voltages are added for obtaining the constant voltage.

Figure 16:
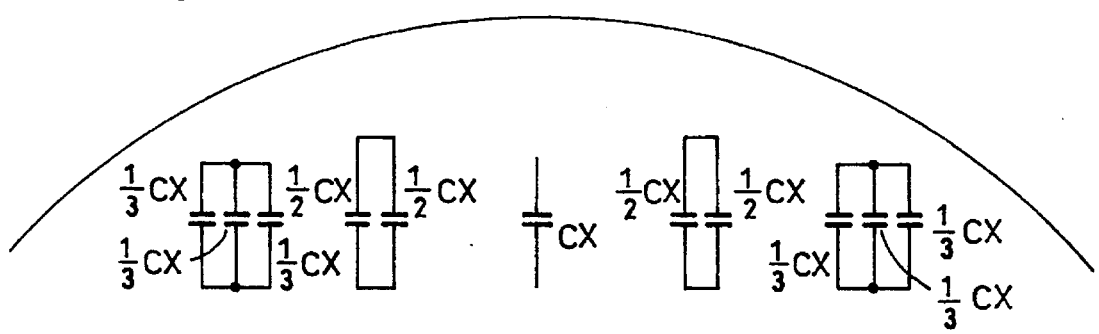
FIG. 16 is an explanatory view for still another embodiment of the present invention.
Figure 17:
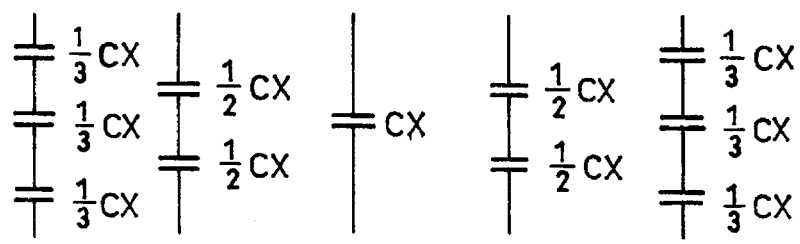
FIG. 17 is a circuit diagram showing a working aspect employable in the embodiment of FIG. 16.

In FIGS. 16 and 17, these is shown another embodiment according to the present invention. In the case of the foregoing embodiment of FIG. 6, the arrangement is made that the number of the capacitors $C_{31}$–$C_{39}$ connected in series is varied in the period B of the high input voltage $V_{in}$ so as to vary the capacitance to be Cx, 2Cx, 3Cx . . . in accordance with the number of the capacitors in the series connection, the current similar to the input voltage $V_{in}$ is made to be taken up by the switched capacitor circuit 13 with the composite capacitance made constant irrespective of the input voltage $V_{in}$, and the storage capacitor $C_5$ is charged by connecting in parallel the capacitors $C_{31}$–$C_{39}$ charged in the series connection.

In the present embodiment, on the other hand, the arrangement is made so that the capacitors $C_{31}$–$C_{39}$ are charged in the parallel relationship and are connected in series for charging the storage capacitor $C_5$. In this case, the number of the capacitors connected in parallel is reduced as the input voltage $V_{in}$ rises. Thus, in the present embodiment, the capacitance is not made to vary in accordance with the variation in the input voltage $V_{in}$ upon connection in parallel, for which purpose the capacitance of the capacitors $C_{31}$–$C_{39}$ is so set that the capacitor to be connected in a single body to the output side of the diode bridge circuit DB will have a capacitance Cx, each of the two parallel connected capacitors has a capacitance Cx/2, and each of three parallel connected capacitors has a capacitance Cx/3. Accordingly, the composite capacitance is made to be Cx, and the waveforms of the current caused to flow to the switched capacitor circuit 13 is made to be similar to that of the input voltage $V_{in}$. The charging of the storage capacitor $C_5$ at this time is to be carried out by connecting the respective capacitors in the series manner. In this case, the arrangement is made so that the storage capacitor $C_5$ is charged to be a constant voltage, without having any correlation to the input voltage $V_{in}$.

Figure 18:
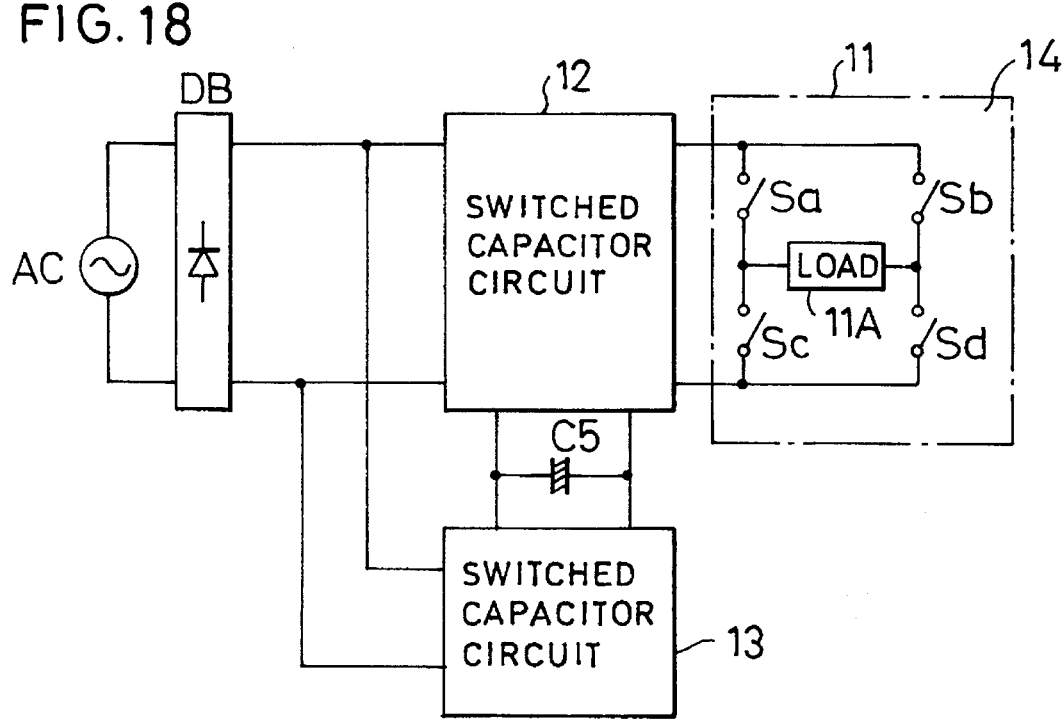
FIGS. 18 and 19 are block circuit diagrams illustrating further embodiments of the present invention.

In another embodiment shown in FIG. 18, other arrangements and functions than that an inverter circuit 14 of a full bridge construction is employed as the load 11 are the same as the embodiments of FIG. 4 and FIGS. 11–13. In the present embodiment, the inverter circuit 14 is formed by a bridge connection of switching elements Sa–Sd, and a load 11A of the inverter circuit 14 as inserted between a junction point of the switching element Sa to the switching element Sc and a junction point of the switching element Sb to the switching element Sd. In this case, the circuit 11 may be another power converting circuit rather than the inverter circuit 14.

Figure 19:
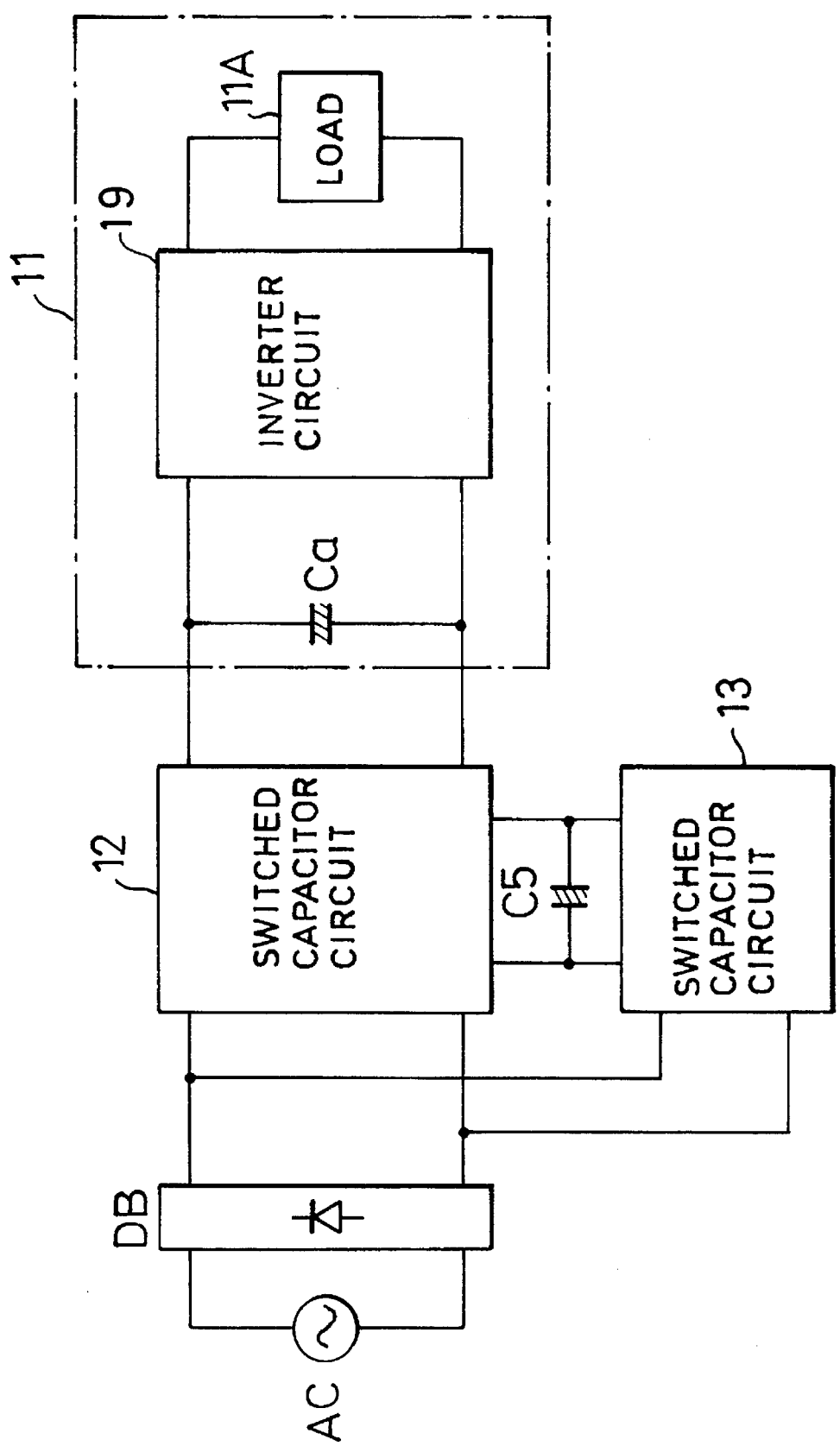

In still another embodiment shown in FIG. 19 according to the present invention, a capacitor Ca is connected to the output side of the switched capacitor circuit 12 in the embodiment of FIG. 4, energy provided from the switched capacitor circuit 12 is once accumulated once in this capacitor Ca, and the power supplied by this capacitor Ca is converted into AC power to be supplied to the load 11A.

Figure 20:
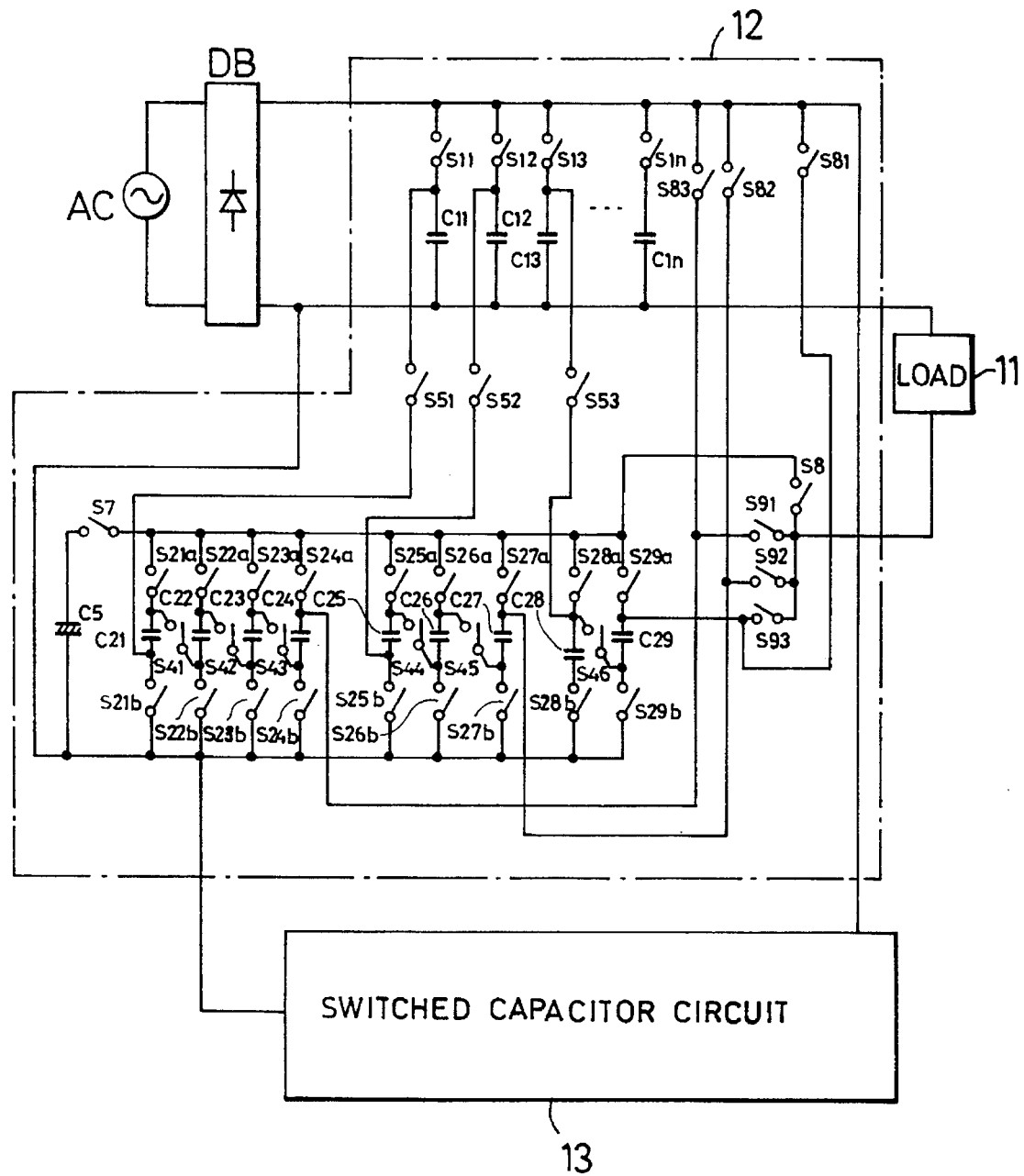
FIG. 20 is a circuit diagram showing another embodiment of the present invention.

In another embodiment shown in FIG. 20 of the present invention, the switched capacitor circuit 12 has an arrangement in which two groups of circuit elements including the capacitors $C_{11}$–$C_{1n}$ and the capacitors $C_{21}$–$C_{29}$ are mutually reversed in their position with respect to the input voltage $V_{in}$. In this case, the switching elements $S_{11b}$–$S_{1nb}$ on negative pole side of the diode bridge circuit DB of the capacitors $C_{11}$–$C_{1n}$ can be omitted. Thus, the switching elements $S_{11a}$–$S_{1na}$ on the positive pole side are denoted as $S_{11}$–$S_{1n}$.

Figure 21:
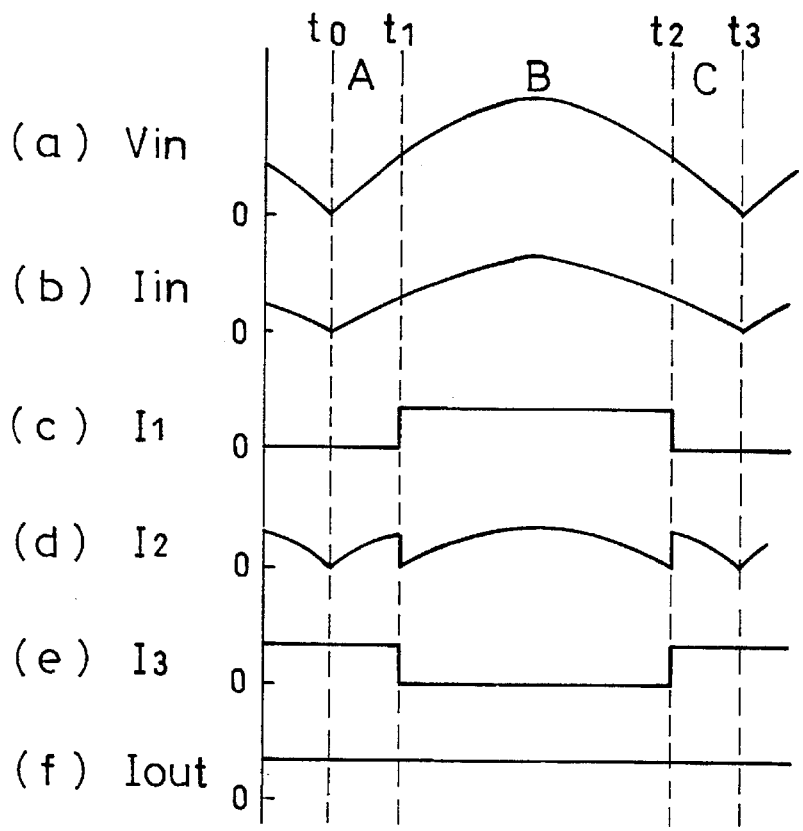
FIG. 21 is a waveform diagram illustrating the operation of still another embodiment of the present invention.

In another embodiment of the present invention as shown by a chart in FIG. 21, in contrast to the foregoing embodiments in which the current made similar to the input voltage $V_{in}$ is caused to flow alternately by the switched capacitor circuits 12 and 13, the switched capacitor circuit 12 takes up the constant current $I_1$ as shown by FIG. 21(c) during the period B of the high input voltage $V_{in}$ as in FIG. 21(a) while the switched capacitor circuit 13 takes up a current $I_2$ such as shown in FIG. 21(d) which is a balance of the current $I_t$ on the side of the switched capacitor circuit 12 from such desired input current $I_{in}$ as shown in FIG. 21(b). Here, the current $I_2$ is made to be of a similar waveform to the input voltage $V_{in}$.

Further, during the periods A and C of the low input voltage $V_{in}$, the current $I_1$ is not taken up by the switched capacitor circuit 12, but the current $I_2$ only is taken up by the switched capacitor circuit 13. The current $I_2$ is also made similar in the waveform to the input voltage $V_{in}$. With this arrangement, too, the waveform of the input current $I_{in}$ which is a composite current of the currents $I_1$ and $I_2$ is made similar to the input voltage $V_{in}$, and the higher harmonics distortion of the input current can be eliminated. Also in the present embodiment, the power is supplied from the switched capacitor circuit 12 to the load 11, the energy accumulated in the switched capacitor circuit 13 is utilized by the switched capacitor circuit 12 as added to the energy supplied through the diode bridge circuit DB, so as to supply to the load 11 power of constant voltage.

Figure 22:
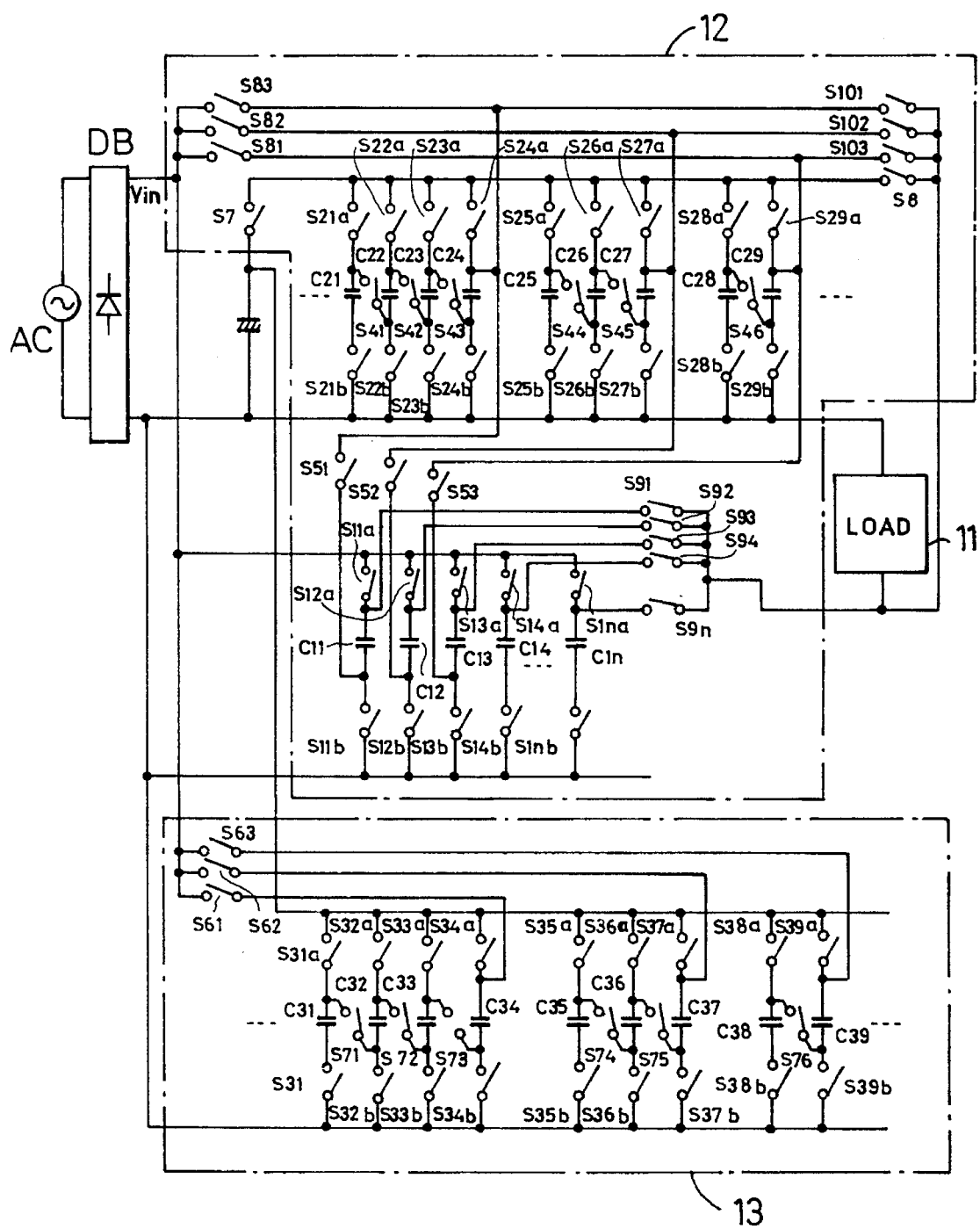
FIG. 22 is a detailed circuit diagram showing another embodiment of the present invention.
Figure 23:
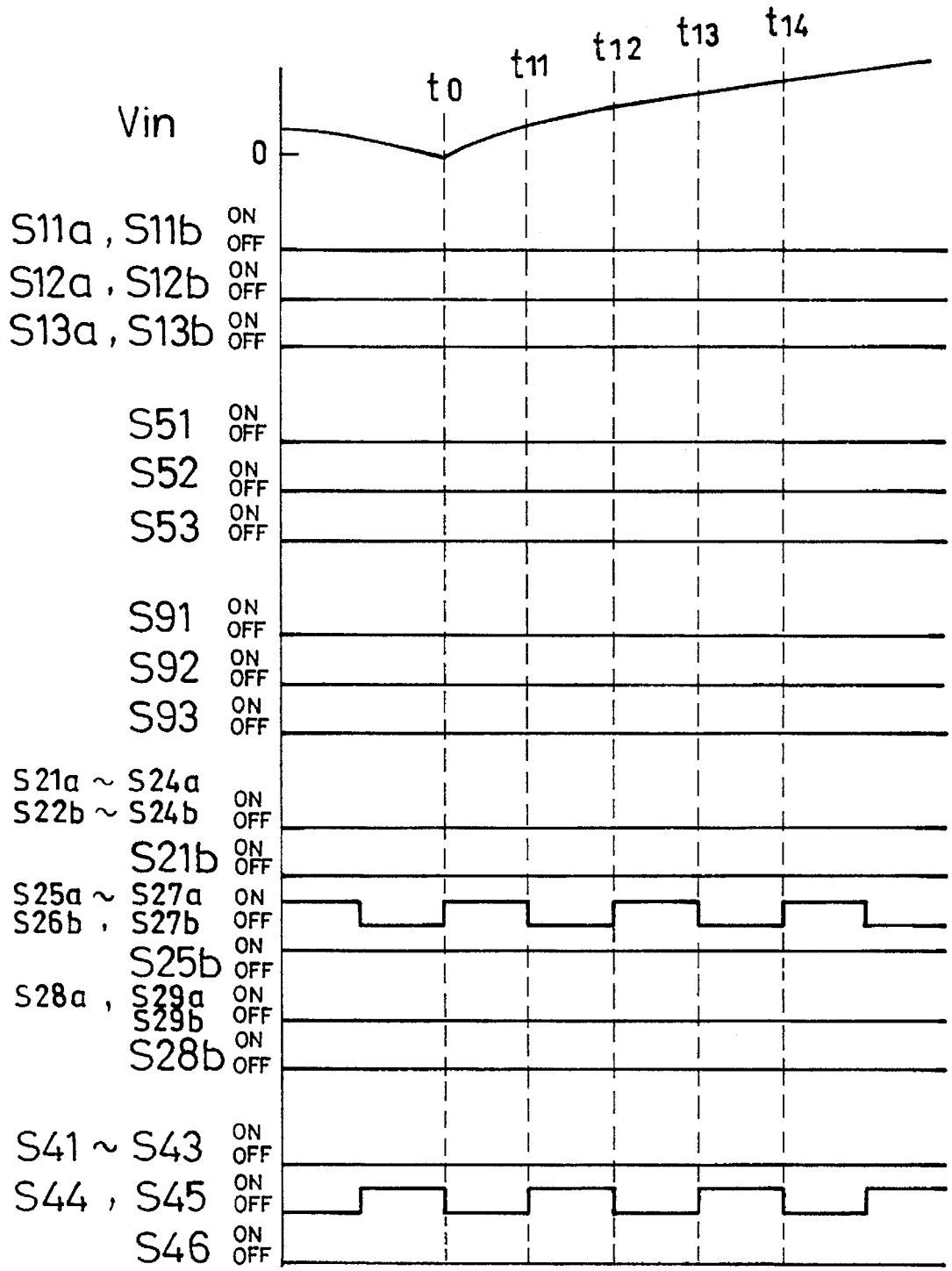
FIGS. 23 and 24 are waveform diagrams illustrating the operation of the embodiment of FIG. 22.
Figure 24:
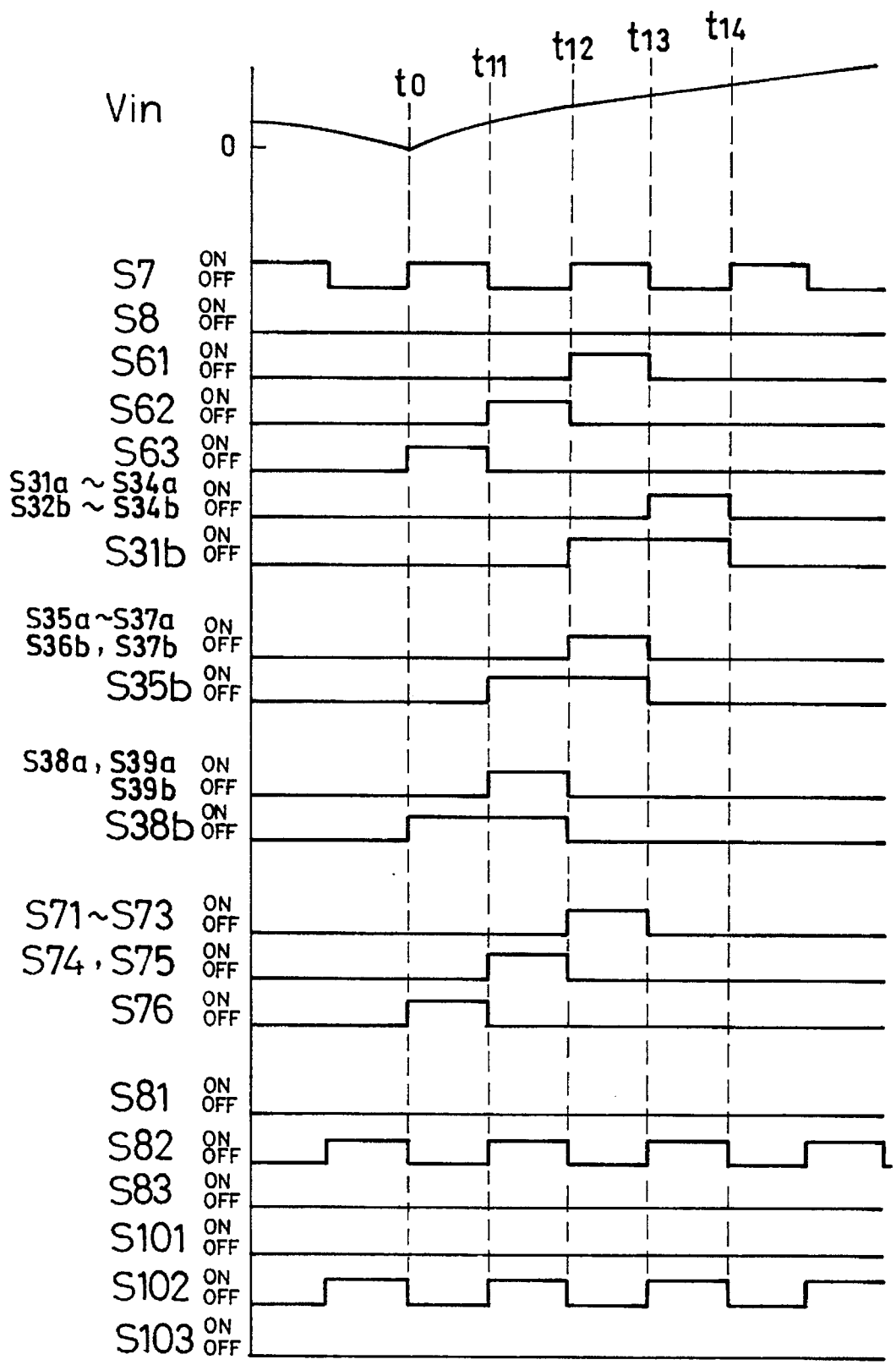

In another embodiment of the present invention as shown in FIGS. 22–24, the capacitors $C_{21}$–$C_{29}$ of the switched capacitor circuit 12 are made to be of the same capacitance, while the capacitors $C_{31}$–$C_{39}$ in the switched capacitor circuit 13 are set to have capacitances of 2Cx at the capacitors $C_{38}$ and $C_{39}$, 3Cx at the capacitors $C_{35}$–$C_{37}$ and 4Cx at the capacitors $C_{31}$–$C_{34}$, so that the same capacitance will be attained when the capacitors are connected in series.

In addition, the operation of the switching elements shall be described in the following paragraphs with reference to the connecting relationship of the capacitors while omitting references to the ON/OFF operation of the elements. At time $t_0$ first, the capacitors $C_{38}$ and $C_{39}$ are connected in series to the output side of the diode bridge circuit DB to charge them, and the capacitors $C_{25}$–$C_{27}$ are connected in parallel with the storage capacitor $C_5$ to charge the same.

At time $t_{11}$, the capacitors $C_{25}$–$C_{27}$ are connected in series to have the power supplied to the load 11. At this time, the capacitors $C_{38}$ and $C_{39}$ are connected in parallel with the storage capacitor $C_5$ to charge the same. At the same time, the capacitors $C_{35}$–$C_{37}$ are connected to the output side of the diode bridge circuit DB to be charged in series.

At time $t_{12}$, the capacitors $C_{25}$–$C_{27}$ are again connected in parallel with the storage capacitor $C_5$ to charge it, while the capacitors $C_{35}$–$C_{37}$ are also connected in parallel with the storage capacitor $C_5$ to charge the same. At the same time, the capacitors $C_{31}$–$C_{34}$ are connected to the output side of the diode bridge circuit DB to be charged thereby.

At time $t_{13}$ next, the capacitors $C_{25}$–$C_{27}$ are connected in series, and the power is supplied to the load 11, upon which the capacitors $C_{31}$–$C_{34}$ are connected in parallel with the storage capacitor $C_5$ for its charging. In this event, too, the capacitance of the switched capacitor circuit 13 connected to the output side of the diode bridge circuit DB is constant, so that the input current $I_{in}$ similar to the input voltage $V_{in}$ can be made to flow, and the higher harmonics distortion of the input current can be eliminated. Further, as the storage capacitor $C_5$ is charged by connecting the capacitors $C_{31}$–$C_{39}$ in parallel therewith, the storage capacitor $C_5$ can be charged to be substantially at a constant voltage irrespective of any variation in the input voltage $V_{in}$ and thus independently, and the power supplied from the capacitors $C_{25}$–$C_{27}$ to the load 11 can be made at a constant voltage value.

Further, while in the above case the accumulated charge in the switched capacitor circuit 13 is shifted once to the storage capacitor C5, it should be appreciated that the arrangement may be made so that the accumulated charge is shifted in series to the capacitors $C_{23}$–$C_{27}$ in the switched capacitor circuit 12.

In a period corresponding to the period B from $t_1$ to $t_2$ in FIG. 21, the switched capacitor circuit 12 takes up a constant current from the output of the diode bridge circuit DB. That is, it is enabled to render the current supplied from the diode bridge circuit DB to the switched capacitor circuit 12 to be constant, by varying the capacitance of the capacitor component in the switched capacitor circuit 12 which component being connected to the diode bridge circuit DB, so as to be decreased when the input voltage $V_{in}$ increases but oppositely to be increased when the input voltage $V_{in}$ decreases. Here, in the switched capacitor circuit 13, the same operation as that in the period A from time $t_0$ to $t_1$ in FIG. 21 (in the period from time $t_0$ to time $t_{14}$ in FIGS. 23 and 24) can be realized. Accordingly, it is possible to eliminate the higher harmonics distortion of the input current by an arrangement in which the current resulting from an addition of the current of the switched capacitor circuit 12 to the current of the switched capacitor circuit 13 is of the waveform similar to the waveform of such input voltage $V_{in}$ as shown in FIG. 21(b). Further, it is contemplated that the power supplied from the switched capacitor circuit 12 to the load 111 can be made constant in the voltage by means of a combination in series or parallel connection of proper ones of the capacitors $C_{11}$–$C_{1n}$ and $C_{21}$–$C_{29}$.

Figure 25:
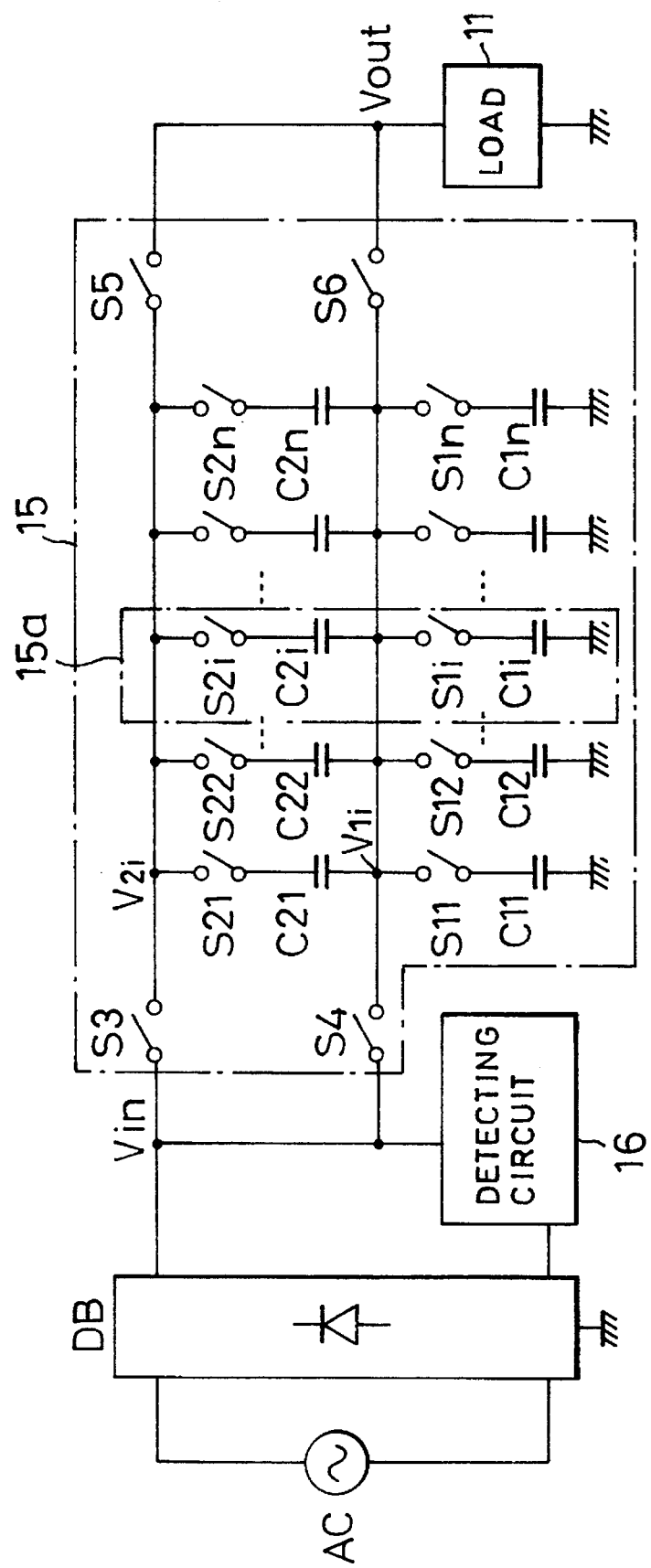
FIG. 25 shows in a circuit diagram still another embodiment of the present invention.
Figure 26:
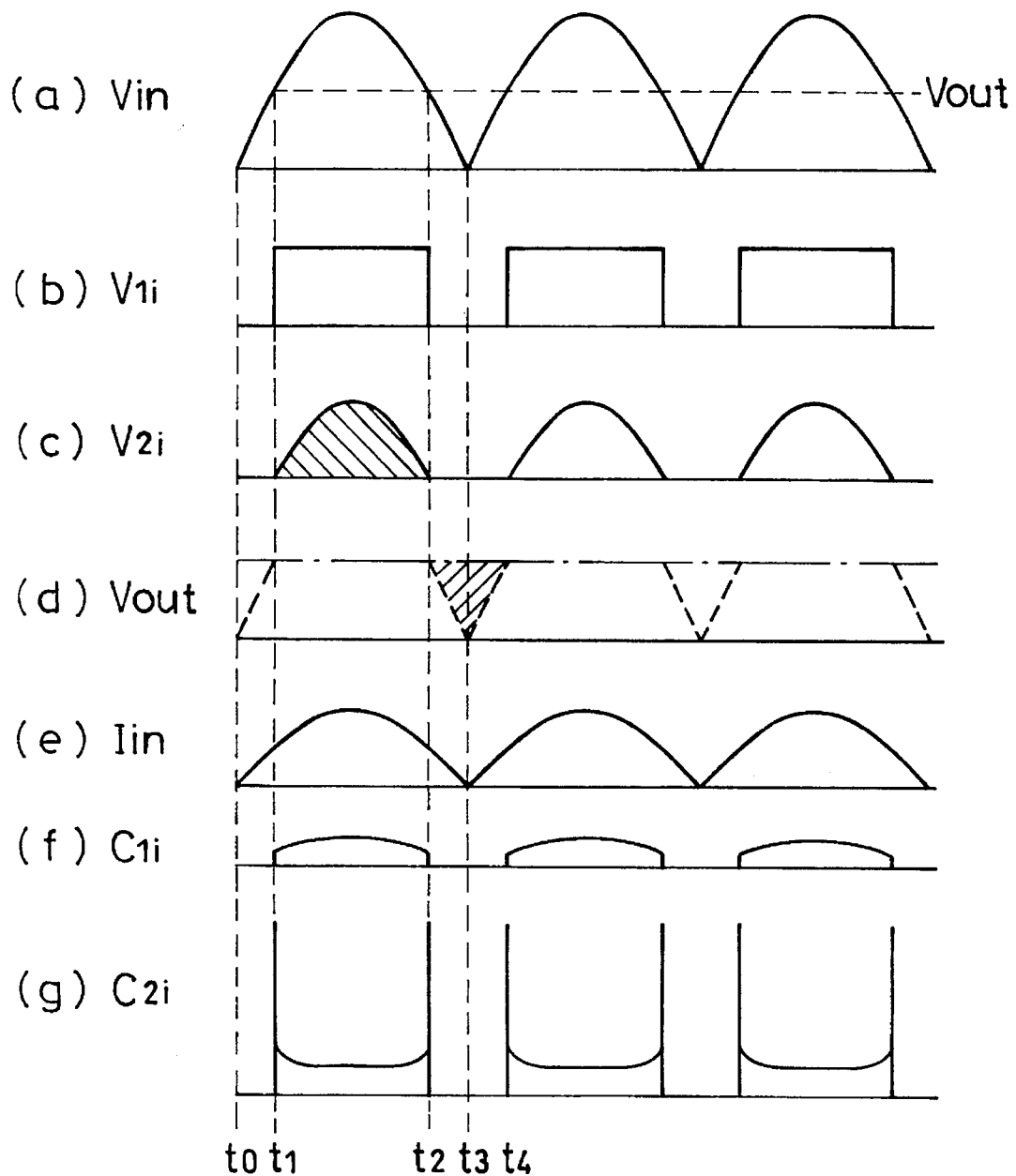
FIG. 26 is a waveform diagram illustrating the operation of the embodiment in FIG. 25.

In FIG. 25, there is shown another embodiment according to the present invention, in which the power converter is constituted for converting the pulsating voltage which is the output voltage $V_{in}$ of the diode bridge circuit DB into the constant DC voltage $V_{out}$ (see the waveform (a) in FIG. 26) which is lower than the maximum value of the particular pulsating voltage. In this case, the switched capacitor circuit 15 comprises a plurality of series capacitor circuits 15a respectively comprising the switching elements $S_{1i}$ and $S_{2i}$ (i=1, 2, ..., n) and the capacitors $C_{1i}$ and $C_{2i}$ (i=1, 2, ..., n). In the respective series capacitor circuits 15a, the switching element $S_{1i}$ (i=1, 2, ..., n) and capacitor $C_{1i}$ (i=1, 2, ..., n) are each formed of series circuits which are mutually in parallel relationship as a whole, and the switching element $S_{2i}$ (i=1, 2, ..., n) and capacitor $C_{2i}$ (i=1, 2, ..., n) are also each formed of series circuits which are mutually in a parallel relationship as a whole, while a block of the series circuits formed by the switching elements $S_{1i}$ (i=1, 2, ..., n) and capacitors $C_{1i}$ (i=1, 2, ..., n) are connected at each end, through switching elements $S_3$ and $S_4$, to the positive pole side of the output ends of the diode bridge circuit DB and, through switching elements $S_5$ and $S_6$, to the positive pole side of the load 11. Further in the present embodiment, a detecting circuit 16 is provided across the both output ends of the diode bridge circuit DB for detecting input voltage and input current to the switched capacitor circuit 15, and the arrangement is so made that the ON/OFF control of the switching elements $S_{1i}$ and $S_{2i}$ (i=1, 2, ..., n) is performed in accordance with outputs of this detecting circuit 16.

For easier understanding of the operation of the present embodiment, the description of the operation shall be briefly made also with reference to FIG. 26. In the present embodiment, a charge the amount of which is denoted by a hatched part in a waveform (c) of FIG. 26) corresponding to a higher component of the input voltage $V_{in}$ than the output voltage $V_{out}$ is stored in the circuit 15 (on the capacitor $C_{2i}$ side) in the period in which the input voltage $V_{in}$ applied from the diode bridge circuit DB to the circuit 15 is higher than the output voltage $V_{out}$ applied from the circuit 15 to the load 11, and the accumulated charge is supplied to the load 11 together with the input voltage $V_{in}$, in the period in which the input voltage $V_{in}$ is lower than the output voltage $V_{out}$, whereby valley portions of the input voltage $V_{in}$ are filled as denoted by a hatched portion in a waveform (d) of FIG. 26, and the power supplied to the load 11 can be made constant in the voltage.

Referring more specifically to the present embodiment, in the period in which the input voltage $V_{in}$ from the diode bridge circuit DB is higher than the output voltage $V_{out}$ ($t_1$-$t_2$ in FIG. 26), the switching elements $S_4$ and $S_5$ are switched OFF but the switching element $S_3$ is switched ON. In this state, the switching elements $S_{1i}$ and $S_{2i}$ are switched ON but the switching element $S_6$ is switched OFF, the capacitors $C_{1i}$ and $C_{2i}$ are connected in series to the output ends of the diode bridge circuit DB to be thereby charged, then the switching elements $S_{2i}$ are switched OFF but the switching element $S_6$ is switched ON, the capacitors $C_{1i}$ are connected in parallel with the load 11, and the power is supplied to the load 11 with the accumulated charge in the capacitors $C_{1i}$ made as the power source.

Here, in order that the voltage of the power supplied from the capacitors $C_{1i}$ to the load 11 is made to be the DC voltage $V_{out}$, the ratio of capacitance of the capacitors $C_{1i}$ and $C_{2i}$ may just be made in such relationship as follows. Accordingly, the voltage of the capacitors $C_{1i}$ is made to be $V_{1i}$ (=$V_{out}$) will be clear from a following formula (1), and the voltage of the capacitors $C_{2i}$ is made to be $V_2$ (=$V_{in}$-$V_{out}$):

$$C_{1i}=(V_{in}-V_{20}-V_{out})C_{2i}/(V_{out}-V_{20}) \tag{1}$$

Here, $V_{20}$ denotes an initial voltage before being charged of the capacitors $C_{2i}$. Further, in order that the input current $I_{in}$ is proportional to the input voltage $V_{in}$, such relational formula as follows becomes necessary. Thus, as the input current $I_{in}$ is proportional to the series composite capacities of the capacitors $C_{1i}$ and $C_{2i}$:

$$2C_{1i}\cdot C_{2i}\{V_{in}-(V_{10}+V_{20})\}/(C_{1i}+C_{2i})=kV_{in} \tag{2}$$

wherein $V_{10}$ denotes the initial voltage before being charged of the capacitors $C_{1i}$, and k is an optional constant having the unit of capacitance.

Conditions of the capacitors $C_{1i}$ and $C_{2i}$ for satisfying the above formulas (1) and (2) concurrently will be $$C_{1i}=kV_{in}/2(V_{out}-V_{10}) \qquad (3)$$

$$C_{2i}=kV_{in}/2(V_{in}-V_{out}-V_{20}) \qquad (4)$$

Further, waveforms (f) and (g) of FIG. 26 represent required capacitance variation of the capacitors $C_{1i}$ and $C_{2i}$ for causing the input current $I_{in}$ made similar to the input voltage $V_{in}$ in the event when the initial voltages $V_{10}$ and $V_{20}$ of the capacitors $C_{1i}$ and $C_{2i}$ are zero, and for supplying to the load 11 the power of the constant DC voltage $V_{out}$. That is, in the case of the present embodiment, the plurality of the series capacitor circuits 15a which can set to be of the capacitance of FIG. 26(f) and (g) are provided as the capacitors $C_{1i}$ and $C_{2i}$, the input voltage $V_{in}$ is detected by the detecting circuit 16 at the time when $V_{in}>V_{out}$ the series capacitor circuit 15a set to be of the capacitance which satisfies the above formulas (3) and (4) is selected the capacitors $C_{1i}$ and $C_{2i}$ are charged in the series, and the power is supplied to the load 11 with the both-end voltage of the capacitors $C_{1i}$ made as the power source. Consequently, it is enabled to supply to the load 11 the power of the constant DC voltage $V_{out}$ in the period of $V_{in}>V_{out}$, and to eliminate the higher harmonics distortion of the input current $I_{in}$ with the input current $I_{in}$ similar to the input voltage $V_{in}$ made to flow.

In the period of $V_{in}>V_{out}$ ($t_2$-$t_4$ in FIG. 26), next, the switching elements $S_3$, $S_6$ and $S_{1i}$ (i being all of 1 to n) are switched OFF while the switching elements $S_4$, $S_5$ and $S_{2i}$ (i being any one of 1 to n) are switched ON, so that the capacitors $C_{2i}$ are connected in series between the positive pole side of the diode bridge circuit DB and the load 11, and the power is supplied to the load 11. Here, as the above capacitor $C_{2i}$ the one having a voltage of the minimum difference from the input voltage $V_{in}$ and output voltage $V_{out}$ in accordance with the variation in the input voltage $V_{in}$ is selected for the connection. Consequently, it is enabled to supply to the load 11 the power of the constant voltage, and further the input current $I_{in}$ can be varied in proportion to the input voltage $V_{in}$ by adjusting the switching period of the switching element $S_5$. With this arrangement, the higher harmonics distortion of the input current $I_{in}$ can be eliminated.

Figure 27:
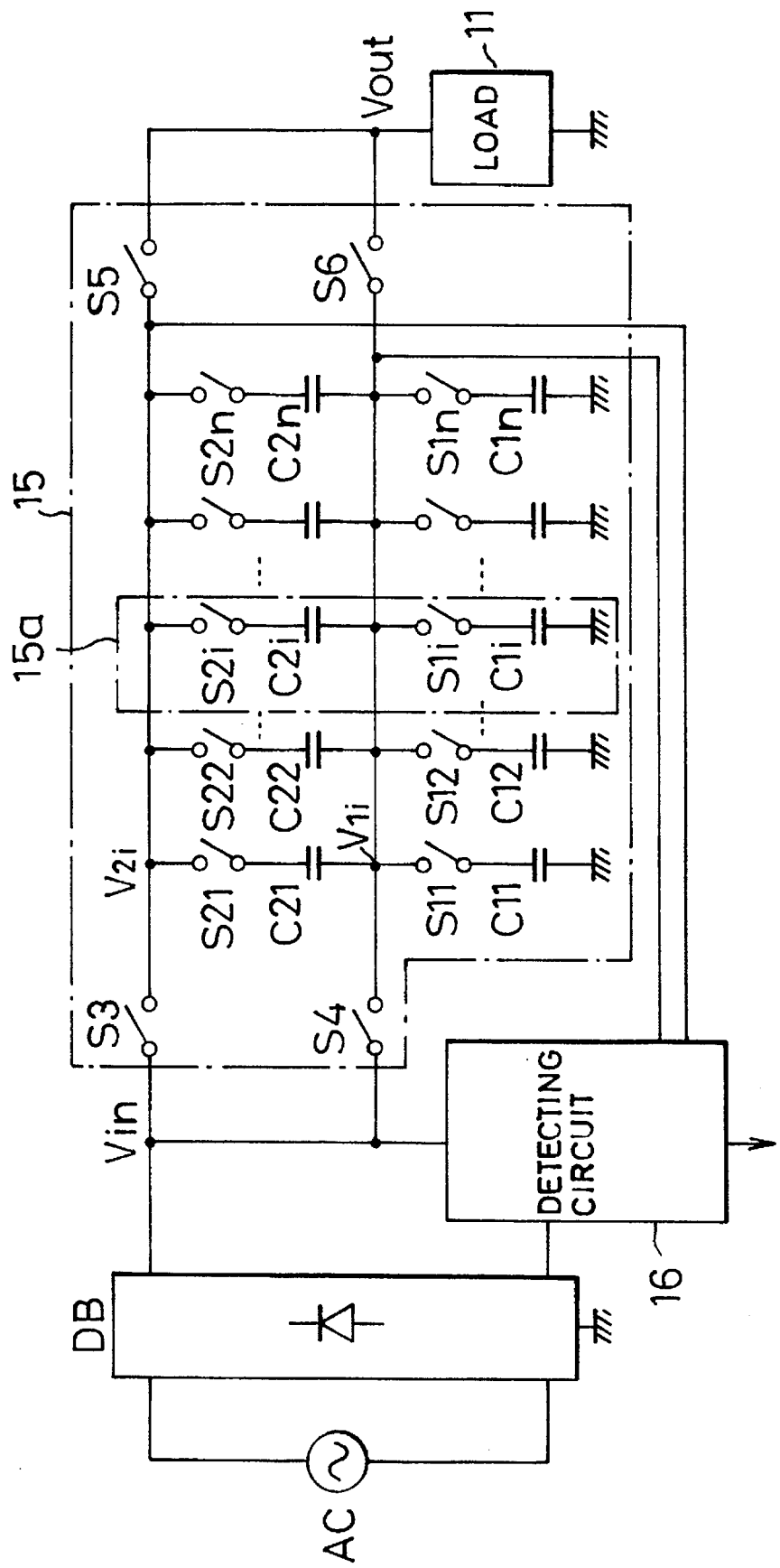
FIG. 27 is a circuit diagram of another embodiment of the present invention.

In FIG. 27, there is shown another embodiment according to the present invention, which is characterized in an arrangement allowing the both-end voltage of the capacitors $C_{1i}$ and $C_{2i}$ to be detected by the detecting circuit 16, and other arrangements are made to be the same as those in the embodiment of FIG. 25. In the present instance, the higher harmonics distortion of the input current can be eliminated by controlling the initial voltages $V_{10}$ and $V_{20}$ of the capacitors $C_{1i}$ and $C_{2i}$, only by setting the capacitors $C_{1i}$ and $C_{2i}$ without controlling the output voltage $V_{out}$ as in the embodiment of FIG. 12, and the power of the constant voltage can be supplied to the load 11.

Figure 28:
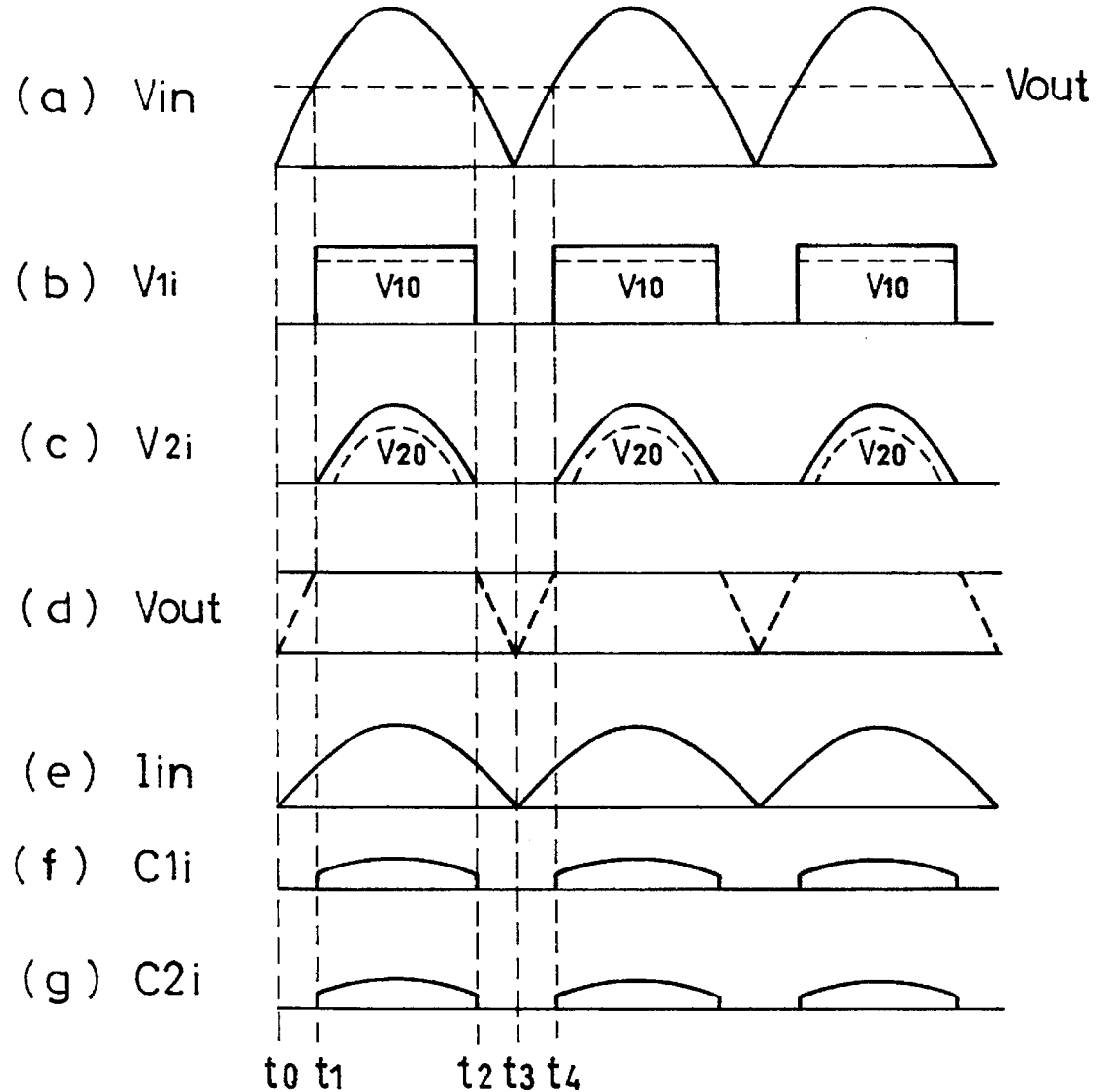
FIGS. 28 and 29 are waveform diagrams illustrating the operation of the embodiment shown in FIG. 27.

Referring more specifically to the present embodiment by reference to FIG. 28, the initial voltages $V_{10}$ and $V_{20}$ of the capacitors $C_{1i}$ and $C_{2i}$, for example, are to be so set as to be lower by 5 V than the both-end voltages $V_{1i}$ ($=V_{out}$) and $V_{21}$ ($=V_{in}-V_{out}$) of the capacitors $C_{1i}$ and $C_{2i}$, and $$V_{10}=V_{out}-5, \text{ and}$$

$$V_{20}=V_{in}-V_{out}-5$$

are obtained. Substituting the above into the foregoing formulas (3) and (4), the capacitance of the capacitors $C_{1i}$ and $C_{2i}$ will be $$C_{1i}=C_{2i}=kV_{in}/10$$

and, as shown in FIG. 28(f) and (g), the capacitance of the capacitors $C_{1i}$ and $C_{2i}$ can be made to be a value made to be proportional to the input voltage $V_{in}$. It is thereby made advantageous in that the control of the switching elements $S_{1i}$, $S_{2i}$ and $S_3$-$S_6$ can be executed in simpler manner than in the case of the embodiment of FIG. 25 by controlling the initial voltages $V_{10}$ and $V_{20}$ of the capacitors $C_{1i}$ and $C_{2i}$.

Solving the formulas (3) and (4) with reference to the initial voltages $V_{10}$ and $V_{20}$ of the capacitors $C_{1i}$ and $C_{2i}$, $$V_{10}=V_{out}-kV_{in}/2C_{1i} \qquad (5)$$

$$V_{20}=V_{in}(1-k/2C_{2i})+V_{out} \qquad (6)$$

Figure 29:
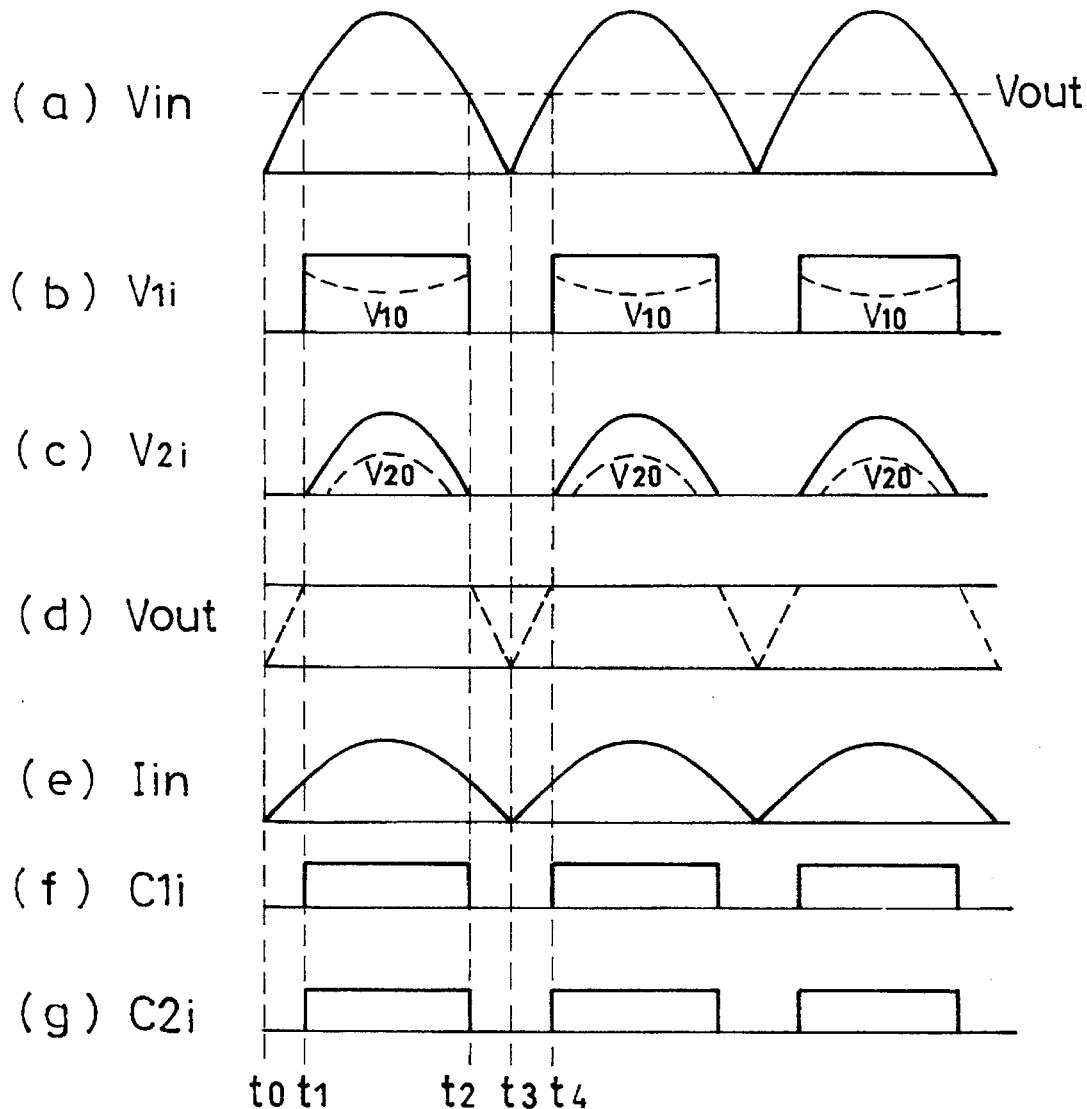

When the capacitance of the capacitors $C_{1i}$ and $C_{2i}$ are made constant here, general waveform of the initial voltages $V_{10}$ and $V_{20}$ will be as shown in FIG. 29, whereby it is enabled to render the capacitance of the capacitors $C_{1i}$ and $C_{2i}$ to be constant, independent of the input voltage $V_{in}$, by controlling the initial voltages $V_{10}$ and $V_{20}$ of the capacitors $C_{1i}$ and $C_{2i}$.

Figure 30:
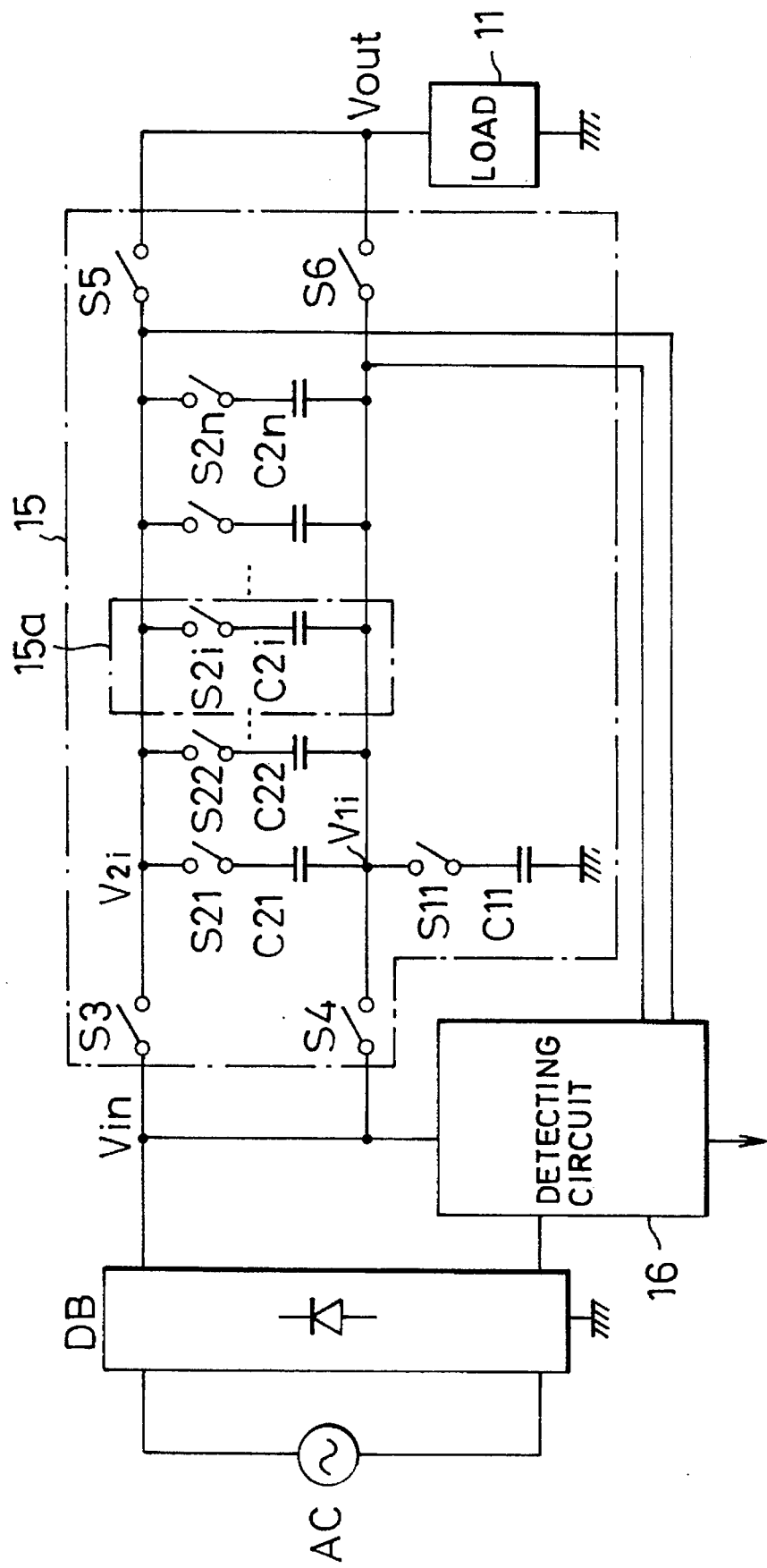
FIGS. 30 and 31 are block circuit diagrams showing further embodiments of the present invention.

In still another embodiment of the present invention as shown in FIG. 30, the embodiment of FIG. 27 is based, and its circuit arrangement is simplified. In order that the charge accumulated in the capacitors $C_{2i}$ in the period $t_1$-$t_2$ shown in FIG. 29 is utilized in the embodiment of FIG. 27 so as to supply at the period $t_2$-$t_4$, it is required to accumulate the charge in all of the capacitors $C_{2i}$ in the period $t_1$-$t_2$, while the capacitors $C_{1i}$ are not required to store the charge so long as their initial voltage $V_{10}$ is set to be at $V_{in}$ used at next charging. Accordingly, in FIG. 30, the capacitors $C_{1i}$ are replaced by the only one capacitor $C_{11}$, so that the circuit arrangement can be simplified.

Figure 31:
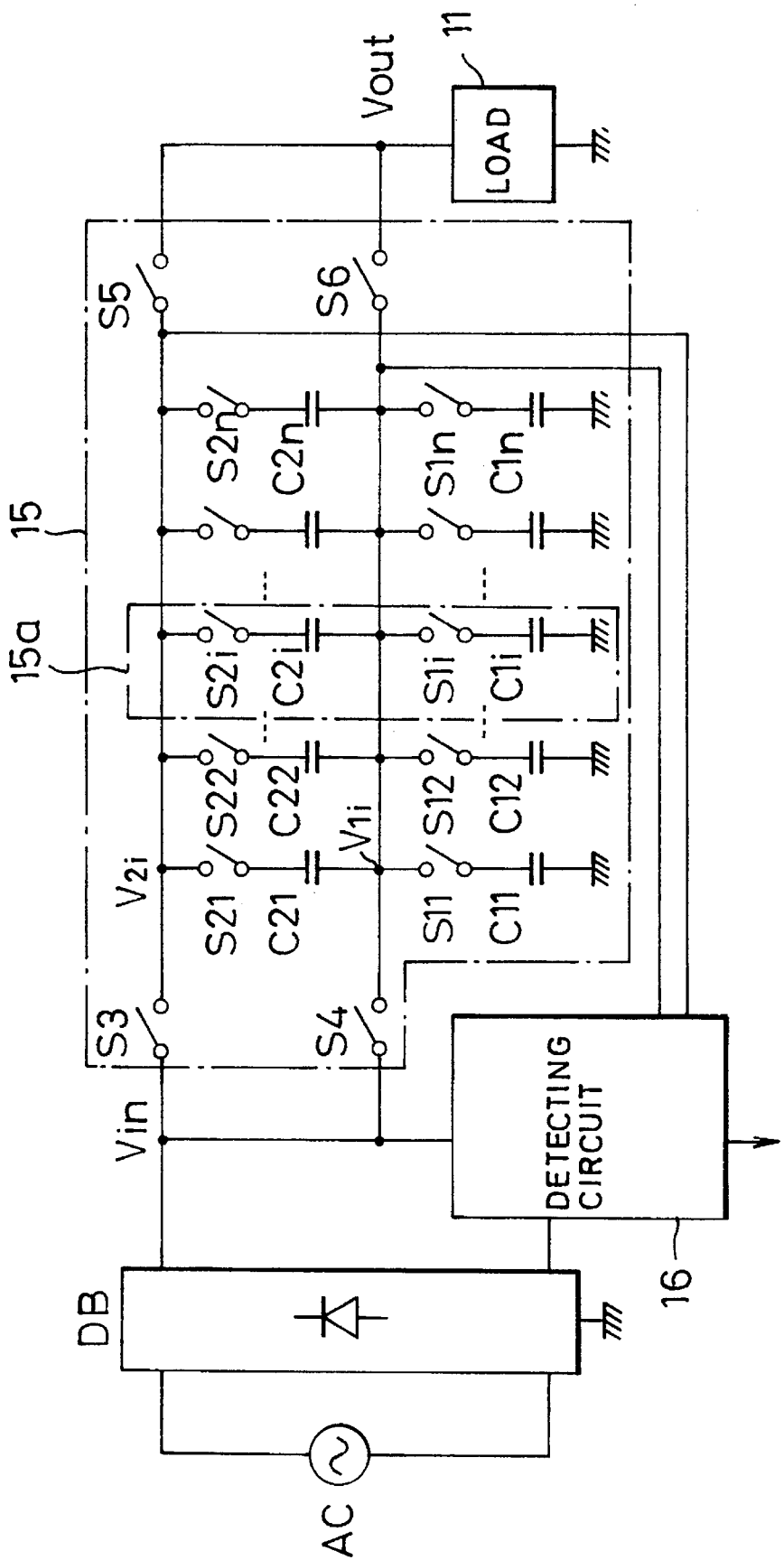

In another embodiment shown in FIG. 31 of the present invention, it is contemplated to cope with an event where the output voltage $V_{out}$ supplied from the switched capacitor circuit 15 to the load 11 is considerably lower than the maximum value of the input voltage $V_{in}$, as shown in FIG. 32(a). That is, the arrangement is made so that, when the input voltage $V_{in}$ is higher than the output voltage $V_{out}$ ($V_{in}>V_{out}$) the switched capacitor circuit 15 supplies to the load 11 the power of the output voltage $V_{out}$, as in the foregoing embodiments of FIG. 25 and so on. When the input voltage $V_{in}$ is lower than the output voltage $V_{out}$ ($V_{in}<V_{out}$), a proper number of the capacitors $C_{2i}$ are connected in series, and the output voltage $V_{out}$ considerably higher than in the case when the input voltage $V_{in}$ is higher than the output voltage $V_{out}$ is supplied as the power to the load 11. It is thereby enabled to supply to the load 11 the power of an aspect in which a high voltage pulse is superposed on a constant low voltage so that, in an event where the load is a discharge lamp, a stable operation of a dimming or a prevention of extinguish can be realized.

For the switching element employed in the foregoing embodiments, bipolar transistors, MOSFET's, thyristors or the like can be effectively utilized.

What is claimed is:

1. A power converter comprising:

a power source providing an instantaneous voltage having a waveform that fluctuates;

first power converting means including at least a plurality of capacitors and switching elements;

a load circuit connected to an output of said first power converting means;

second power converting means including an accumulating capacitor for accumulating power supplied in a period when the instantaneous voltage provided by said power source is higher than a predetermined voltage and discharging the accumulated power to said load circuit in a period when the instantaneous voltage provided by said power source is lower than the predetermined voltage; and control means for causing a predetermined output voltage to be provided from each of said first and second power converting means to said load circuit and rendering a composite current waveform of respective currents taken up by the first and second power converting means to be substantially similar to the waveform of the instantaneous voltage provided by said power source.

2. The power converter according to claim 1 wherein, during the period when the instantaneous voltage is higher than the predetermined voltage, said first power converting means receives a substantially constant current from said power source and supplies a substantially constant power to said load circuit while said second power converting means receives a current substantially similar in waveform to the waveform of the instantaneous voltage to accumulate power in said accumulating capacitor, and, during the period when the instantaneous voltage is lower than the predetermined voltage, said first power converting means receives a current substantially similar in waveform to the waveform of the instantaneous voltage and supplies power to said load circuit while said second power converting means receives the accumulated power from said accumulating capacitor to supply power to said load circuit, and said control means receives power supplied from said first and second power converting means for supplying to said load circuit a substantially constant power.

3. The power converter according to claim 1 wherein, during the period when the instantaneous voltage is higher than the predetermined voltage, said first power converting means receives a substantially constant current from said power source and supplies a substantially constant power to said load circuit while said second power converting means receives a current substantially similar in waveform to the waveform of the instantaneous voltage to accumulate power in said accumulating capacitor, and, during the period when the instantaneous voltage is lower than the predetermined voltage, said second power converting means receives a current substantially similar in waveform to the waveform of the instantaneous voltage and the accumulated power from said accumulating capacitor and supplies power to said first power converting means, and said control means causes said first power converting means to receive the power supplied from said second power converting means for supplying to said load circuit a substantially constant power.

4. A power converter comprising:

a power source providing an instantaneous voltage having a waveform that fluctuates;

first power converting means including first and second groups of capacitors and a plurality of first switching elements and receiving a source voltage from said power source;

a load circuit connected to an output of said first power converting mean;

second power converting means connected to said power source and to said first power converting means, said second power converting means including a third group of capacitors and a plurality of second switching elements;

an accumulating capacitor coupled between said first and second power converting means for accumulating power supplied in a first period when the instantaneous voltage is higher than a predetermined voltage and discharging the accumulated power to said load circuit in a second period when the instantaneous voltage is lower than the predetermined voltage; and control means for causing a predetermined output voltage to be provided from at least said first power converting means to said load circuit and rendering a composite current waveform of respective currents taken up by the first and second power converting means to be substantially similar to the waveform of the instantaneous voltage, wherein, in the first period, said first power converting means sequentially varies connection of capacitors of said second group of capacitors to said power source in accordance with increments in the instantaneous voltage to cause a composite capacitance of said second group of capacitors to be decreased, so as to receive from said power source a substantially constant current in order to supply a constant power sequentially to said load circuit, while said second power converting means sequentially varies connection of capacitors of said third group of capacitors to said power source in accordance with increments in the instantaneous voltage to cause a composite capacitance of said third group of capacitors to be substantially constant for sequentially receiving a current substantially similar in waveform to the waveform of the instantaneous voltage, and changing connection of capacitors of said third group of capacitors from a series connection to a parallel connection in accordance with the increments in the instantaneous voltage, said accumulating capacitor being sequentially charged from said capacitors of said third group connected in parallel, and, in the second period, said first power converting means changes, sequentially, connection of capacitors of said first group of capacitors to said power source to receive a current substantially similar in waveform to the waveform of the instantaneous voltage, while capacitors in said second group capacitors connected across said accumulating capacitor are sequentially connected in accordance with variations in the instantaneous voltage to charge said second group of capacitors, and said control means sequentially varies connection of capacitors of said second group of capacitors from a parallel connection to a series connection in accordance with variations in the instantaneous voltage, and a voltage of said first group of capacitors is added to a voltage of said second group of capacitors, sequentially connected, to sequentially supply to said load circuit a substantially constant power.

5. The power converter according to claim 4 wherein, in the first period, the composite capacitance of said second group of capacitors is decreased by sequentially increasing series connections of the capacitors of said second group of capacitors connected across said power source, in accordance with the increase in the instantaneous voltage, for receiving the substantially constant current from said power source and supplying the constant power to said load circuit, while said second power converting means sequentially increases series connections of capacitors of said third group of capacitors connected across said power source in accordance with the increase in the instantaneous voltage, with their respective capacitances maintained substantially constant, rendering a voltage on any one of the capacitors of said third group substantially constant for receiving the current substantially similar in waveform to the waveform of the instantaneous voltage, and further converting series connections of the capacitors of said third group capacitors to parallel connections sequentially in accordance with the increase in the instantaneous voltage, for accumulation of power in said accumulating capacitor from the capacitors of said third group capacitors connected in parallel, and, in the second period, the first power converting means changes connection of the capacitors of said first group of capacitors for receiving the current of substantially similar waveform to the waveform of the instantaneous voltage, sequentially decreasing the capacitors of said second group of capacitors connected across said accumulating capacitor in accordance with the increase in the instantaneous voltage, for charging said accumulating capacitor, and said control means supplies to said load circuit substantially constant power by adding a voltage of the capacitors of said first group of capacitors having sequentially changed connections to a voltage of the second group of capacitors sequentially connected in series.

6. The power converter according to claim 5 wherein each of the capacitors in said first and second groups of capacitors has the same capacitance.

7. The power converter according to claim 5 wherein the capacitors of said third group of capacitors have capacitances substantially proportional to the instantaneous voltage applied across respective capacitors connected in series.

8. The power converter according to claim 5 wherein, in the second period, said first power converting means sequentially increases the capacitance and the capacitors of said first group of capacitors connected in series and across said power source in accordance with the increase in the instantaneous voltage, from a capacitance of a single capacitor of said first group of capacitors, through a capacitance two times as large as the capacitance of the single capacitor, to a capacitance n times as large as the capacitance of the single capacitor, for maintaining the composite capacitance of said first group of capacitors substantially constant, while rendering the voltage on any one of the capacitors of said first group of capacitors substantially constant, so as to receive a current substantially similar in waveform to the waveform of the instantaneous voltage, and sequentially decreases the capacitors of said second group of capacitors connected across said accumulating capacitor in accordance with the increase in the instantaneous voltage, for charging said accumulating capacitor, and said control means converts the capacitors of said second group of capacitors from parallel connections to series connections by sequentially decreasing the capacitors of said second group of capacitors in accordance with the increase in the instantaneous voltage, and supplies to said load circuit the substantially constant power by adding the voltage of each of the capacitors of said first group of capacitors sequentially changed to series connections to the voltage of the capacitors connected in series of said second group of capacitors.

9. The power converter according to claim 5 wherein, in the first period, said first power converting means receives the substantially constant power from said power source with said composite capacitance decreased by sequentially reducing the capacitors of said second group of capacitors connected in parallel across said power source in accordance with the increments in the instantaneous voltage, and said control means supplies to said load circuit the substantially constant power by converting parallel connections of the capacitors of said second group of capacitors into series connections sequentially reduced in number in accordance with the increments in the instantaneous voltage.

10. The power converter according to claim 5 wherein, in the first period, said second power converting means causes capacitors of said third group of capacitors connected in parallel to be sequentially reduced in accordance with the increments in the instantaneous voltage, for maintaining the composite capacitance substantially constant for receiving the current having the waveform substantially similar to the waveform of the instantaneous voltage, and said control means converts parallel connections of capacitors of said third group of capacitors to series connections in accordance with the increments in the instantaneous voltage, sequentially, for accumulating charge in said accumulating capacitor with the charge of said third group of capacitors connected in series as the source power.

11. The power converter according to claim 1 wherein said load circuit comprises an inverter circuit including a full-bridge arrangement.

12. The power converter according to claim 1 wherein said load circuit comprises a capacitor connected across output terminals of the output of said first power converting means, an inverter circuit section connected across said capacitor, and a load connected across output terminals of said inverter circuit section.

13. The power converter according to claim 1 wherein, in the period when the instantaneous voltage than is higher the predetermined voltage, said first power converting means receives from said power source a substantially constant current and supplies to said load circuit a substantially constant power, while said second power converting means receives a current having a waveform substantially similar to the waveform of the instantaneous voltage and accumulates a charge in said accumulating capacitor, and, in the period when the instantaneous voltage is lower than the predetermined voltage, said control means causes said first power converting means to generate an output voltage in accordance with an accumulated charge supplied from said accumulating capacitor, the output voltage is added to the instantaneous voltage for supplying to said load circuit substantially constant power.

14. The power converter according to claim 13 wherein, in the period when the instantaneous voltage is higher than the predetermined voltage, said first power converting means varies increments and decrements in the capacitance of said plurality of capacitors connected across said power source in inverse direction to the fluctuation of the instantaneous voltage for receiving a substantially constant current and supplying to said load circuit a substantially constant power while said second power converting means accumulates in said accumulating capacitor a charge with a current substantially similar in waveform to the instantaneous voltage, and, in the period when the instantaneous voltage is lower than the predetermined voltage, said control means causes said first power converting means to generate an output voltage in accordance with the accumulated charge in said accumulating capacitor, the output voltage generated being added to the instantaneous voltage for supplying to said load circuit a substantially constant power.

* * * * *